(12) United States Patent
Ieda et al.

(10) Patent No.: US 10,338,383 B2
(45) Date of Patent: Jul. 2, 2019

(54) DISPLAY CONTROL DEVICE

(71) Applicant: MITSUBISHI ELECTRIC CORPORATION, Tokyo (JP)

(72) Inventors: Kuniyo Ieda, Tokyo (JP); Masahiro Kosakada, Tokyo (JP); Masato Hirai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 42 days.

(21) Appl. No.: 15/520,995

(22) PCT Filed: Dec. 25, 2014

(86) PCT No.: PCT/JP2014/084301
§ 371 (c)(1),
(2) Date: Apr. 21, 2017

(87) PCT Pub. No.: WO2016/103395
PCT Pub. Date: Jun. 30, 2016

(65) Prior Publication Data
US 2017/0336627 A1 Nov. 23, 2017

(51) Int. Cl.
*G02B 27/14* (2006.01)
*G02B 27/01* (2006.01)
(Continued)

(52) U.S. Cl.
CPC .......... *G02B 27/0101* (2013.01); *B60K 35/00* (2013.01); *G01C 21/36* (2013.01); *G01C 21/365* (2013.01); *G08G 1/0967* (2013.01); *G09G 3/001* (2013.01); *B60K 2350/2052* (2013.01); *B60K 2350/2056* (2013.01); *G02B 2027/0181* (2013.01); *G02B 2027/0183* (2013.01); *G09G 2340/0464* (2013.01)

(58) Field of Classification Search
CPC .................................... G02B 27/0101
See application file for complete search history.

(56) References Cited

U.S. PATENT DOCUMENTS

2005/0154505 A1* 7/2005 Nakamura ........... G01C 21/365
701/1

FOREIGN PATENT DOCUMENTS

JP 58-76996 A 5/1983
JP 2000-203309 A 7/2000
(Continued)

OTHER PUBLICATIONS

Chinese Office Action issued in correspnoding Chinese Application No. 2014 8008 4343.9 dated Oct. 12, 2018.

*Primary Examiner* — James C. Jones
(74) *Attorney, Agent, or Firm* — Birch, Stewart, Kolasch & Birch, LLP

(57) ABSTRACT

According to an instruction of a display control device, a head-up display displays display information of individual types in a displayable region of a windshield. The display control device includes a type deciding unit for deciding the types of display information; and a display controller for causing the head-up display to display the display information with the types decided by the type deciding unit in the display areas of the displayable region, the display areas being provided for the individual types of display information, and to display the display guides indicating the display areas regardless of the presence or absence of the display information.

6 Claims, 19 Drawing Sheets

(51) Int. Cl.
    *B60K 35/00*         (2006.01)
    *G01C 21/36*       (2006.01)
    *G09G 3/00*         (2006.01)
    *G08G 1/0967*     (2006.01)

(56) References Cited

FOREIGN PATENT DOCUMENTS

| | | |
|---|---|---|
| JP | 2003-345334 A | 12/2003 |
| JP | 2010-208632 A | 9/2010 |
| JP | 2011-126420 A | 6/2011 |
| WO | WO 2013/069141 A1 | 5/2013 |

\* cited by examiner

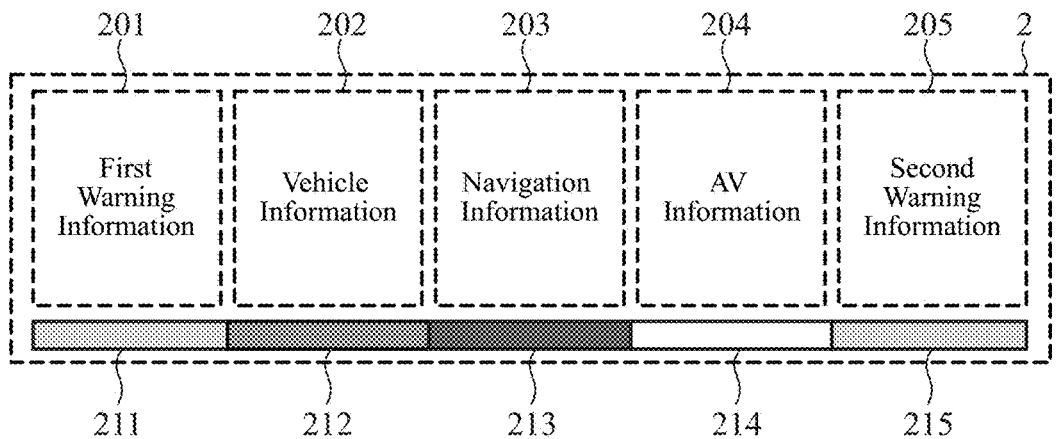
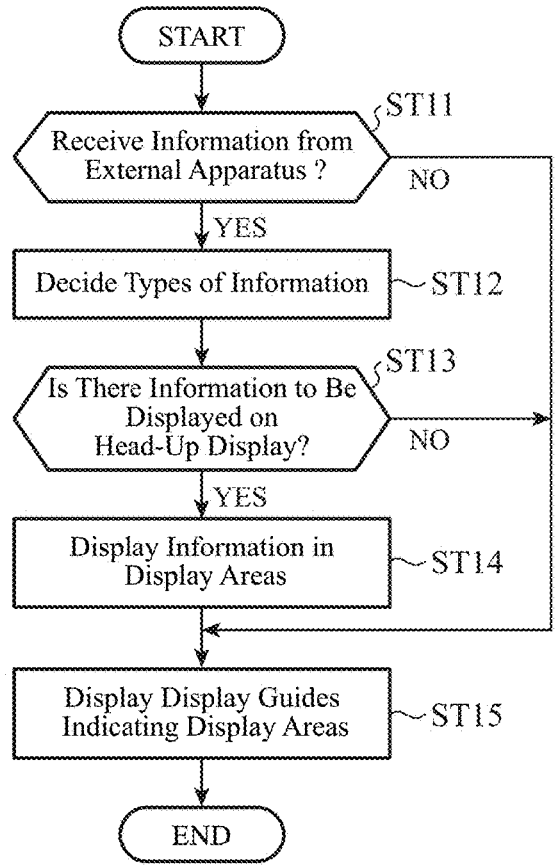

DISPLAY CONTROL DEVICE

TECHNICAL FIELD

The present invention relates to a display control device for controlling a head-up display mounted on a mobile body.

BACKGROUND ART

When a conventional on-vehicle head-up display is used, there are some cases in which a virtual image is displayed at several meters ahead of a windshield. For this reason, it is difficult for a driver to find at which portion information is displayed and anticipate what information is displayed and which portion of the display is used, and as a result, there is a problem in that it takes time for the driver to grasp the information. Furthermore, there is a problem in that the driver is compelled to move his or her line of sight between the actual view and the windshield so as to look for the information displayed.

Thus, when displaying a guide image of a road by superimposing the guide image upon a scene observed from a mobile body, a head-up display of Patent Document 1, for example, surrounds the guide image with an outline, thereby making a boundary clear between the portion where the guide image is displayed and the scene. In this way, the head-up display can improve the visibility of the guide image.

CITATION LIST

Patent Literature

Patent Document 1: WO 2013/069141

SUMMARY OF INVENTION

Technical Problem

Although the head-up display of the Patent Document 1 can improve the visibility of the guide image currently displayed, Patent Document 1 has a problem in that it is difficult to anticipate what to be displayed and where to be displayed as to information that will be displayed hereafter.

The present invention is implemented to solve the foregoing problem. Therefore, it is an object of the present invention to make it easier for a driver to anticipate what information is displayed and which portion of a head-up display is used.

Solution to Problem

A display control device according to the present invention is a display control device for controlling a head-up display that displays a virtual image of display information in a manner as to superimpose the virtual image on a scene outside a moving body, and the display control device includes a type deciding unit for deciding types of display information, and a display controller for causing the head-up display to display the display information with the types decided by the type deciding unit, in display areas of the head-up display, the display areas being provided for the individual types of display information, and to display display guides indicating the individual display areas regardless of presence or absence of the display information.

Advantageous Effects of Invention

According to the present invention, the display control device displays the display guides indicating the individual display areas regardless of whether or not there is information to be displayed in the display areas, so that the display control device makes it easier for the driver to anticipate what information is displayed and which portion of the head-up display is used.

BRIEF DESCRIPTION OF DRAWINGS

FIG. 3 is a diagram illustrating an example of display areas and display guides of the embodiment 1;

FIG. 4 is a flowchart illustrating the operation of the display control device of the embodiment 1;

DESCRIPTION OF EMBODIMENTS

The mode for carrying out the invention will now be described with reference to accompanied drawings to explain the present invention in more detail.

Embodiment 1

Figure 1:
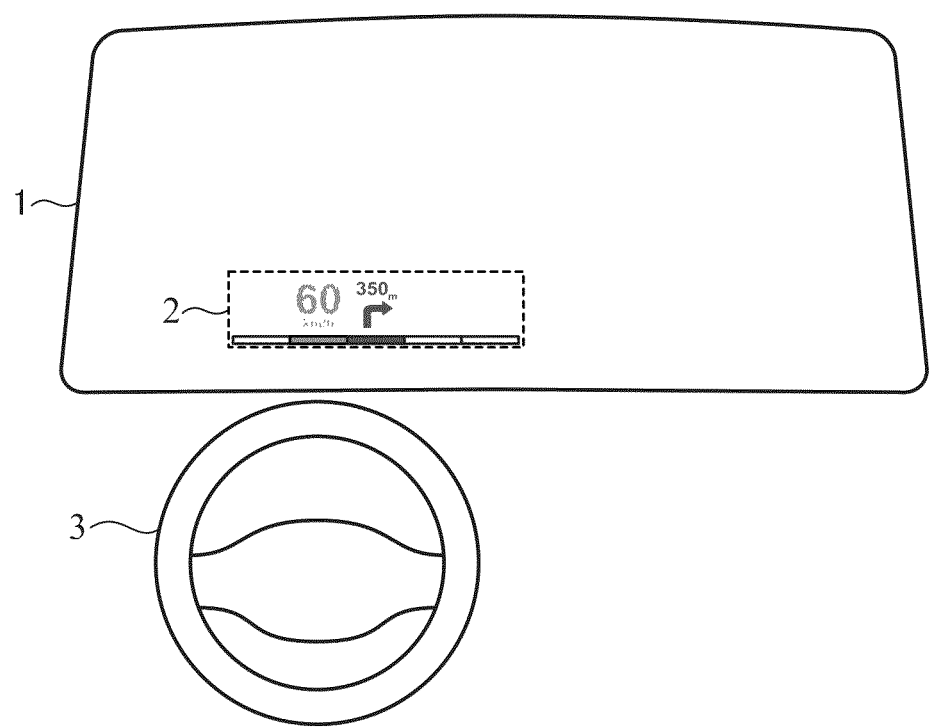
FIG. 1 is a diagram showing a display example of an on-vehicle display system using a display control device according to an embodiment 1 of the present invention.

FIG. 1 shows a display example of an on-vehicle display system using a display control device according to an embodiment 1 of the present invention. The display control device mounted on a vehicle controls a head-up display, thereby causing a displayable region 2 of a windshield 1 to display a plurality of types of information as shown in FIG. 1. The example shown in FIG. 1 displays the vehicle information indicating that the speed of the vehicle is 60 km/h and the navigation information that guides a driver to turn to the right 350 meters ahead. The displayable region 2 is disposed for the driver and set at a position facing the driver's seat (steering wheel 3) on the windshield 1. On the assumption that the driver is the user of a head-up display 10, the description of the on-vehicle display system will be made below.

Figure 2:
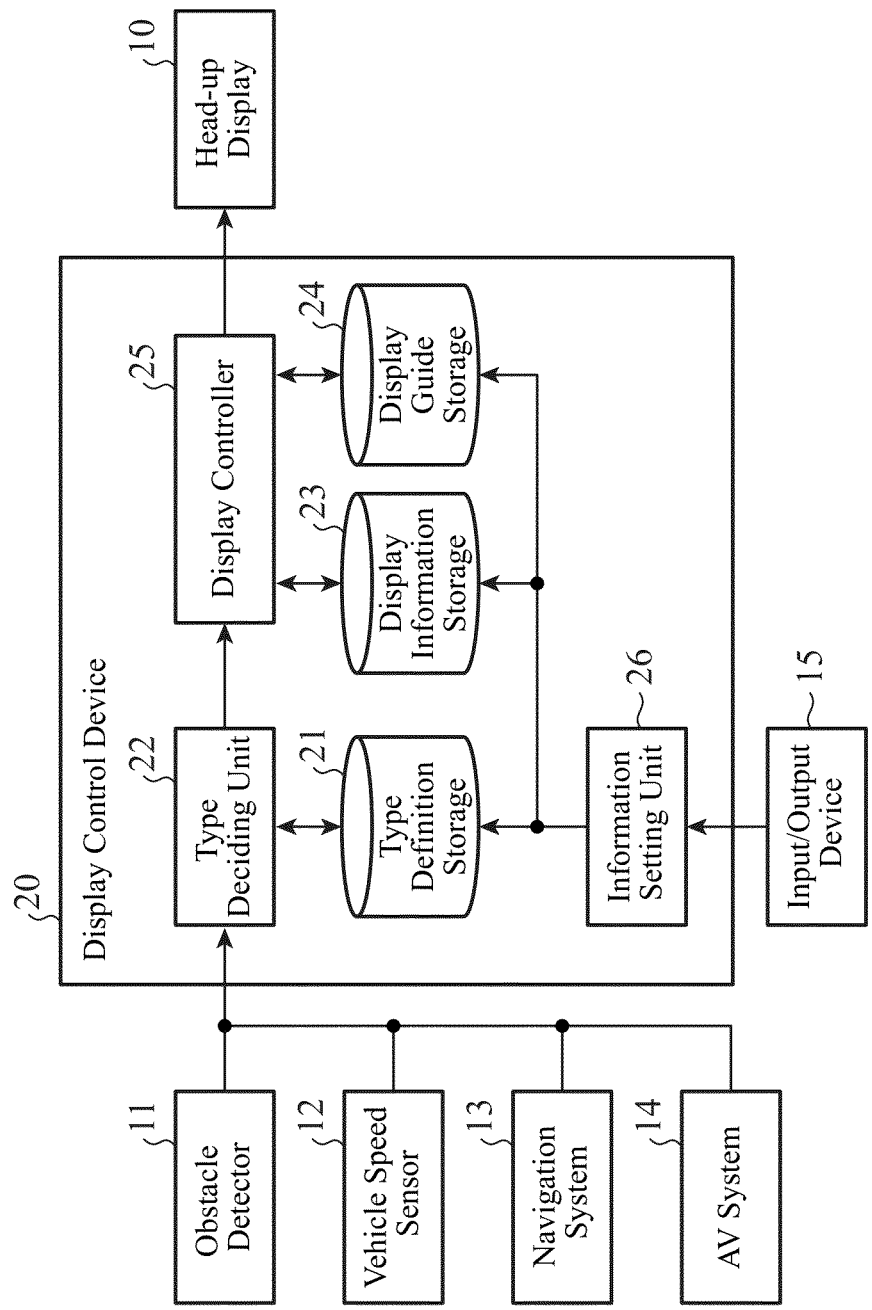
FIG. 2 is a block diagram showing a configuration of the on-vehicle display system using the display control device of the embodiment 1.

FIG. 2 is a block diagram showing a configuration of the on-vehicle display system using a display control device 20 of the embodiment 1. The on-vehicle display system comprises the display control device 20, the head-up display 10, an obstacle detector 11, a vehicle speed sensor 12, a navigation system 13, an AV (Audio Visual) system 14, and an input/output device 15.

The display control device 20 receives various pieces of information output from external apparatuses, generates information to be displayed, and causes the head-up display 10 to display the information. The display control device 20 comprises a type definition storage 21, a type deciding unit 22, a display information storage 23, a display guide storage 24, a display controller 25 and an information setting unit 26. The external apparatuses include, for example, the obstacle detector 11, vehicle speed sensor 12, navigation system 13 and AV system 14 shown in FIG. 2.

The head-up display 10 displays the information designated by the display control device 20 in the displayable region 2 of the windshield 1. The head-up display 10 comprises a display unit that emits the light expressing the information designated by the display control device 20 to the displayable region 2 of the windshield 1. The light emitted from the display unit is reflected in the windshield 1 and visually verified by the driver as a virtual image superimposed on a scene outside the vehicle, which is seen through the windshield 1.

Incidentally, the location at which the information is displayed is not limited to the windshield 1, but can be a combiner or the like installed on the near side of the windshield 1.

The obstacle detector 11 detects an obstacle around the vehicle on the basis of the sensing result of an ultrasonic sensor or a camera outside the vehicle for sensing the surroundings of the vehicle. When detecting an obstacle, the obstacle detector 11 outputs information containing the position of the obstacle and the like to the display control device 20.

The vehicle speed sensor 12 detects the speed of the vehicle, and outputs information on the speed to the display control device 20.

The navigation system 13 is a system that displays a map screen indicating the present position of the vehicle on the display of the navigation system, and that searches for a route to a destination and guides the driver by the route. The navigation system 13 can be provided as a mobile information terminal such as a smartphone, or a Portable Navigation Device (PND), in addition to onboard equipment installed in the vehicle, or may be.

The navigation system 13 provides the display control device 20 with information on navigation guidance, which includes a distance to a destination, names of guide points such as intersections on a route, distances to the guide points, and turning directions at the guide points.

The AV system 14 is a system that reproduces voice information from a speaker and displays image information on the display of the system. The AV system 14 can be provided as an audio device installed in the vehicle, a broadcast receiver such as a radio set and television set, a disk playback device, or a mobile information terminal such as a smartphone.

The AV system 14 provides the display control device 20 with AV information including the title of the music or image being reproduced, the name of a radio station being listened to, or the title of a television program being viewed.

Incidentally, the types of external apparatus described above and the content of the information outputted by the external apparatus are only an example and do not limit the types of external apparatus or the content of the information. For example, the vehicle can provide the display control device 20 with information notifying the failure of the vehicle, information indicating that the amount of the remaining fuel becomes less than a specified value, information about the engine speed in the case of a gasoline-powered car, information about the power consumption in the case of an electric vehicle, information about the ON/OFF state of a right or left blinker switch, information about the shift position of a gear lever, and so on.

The input/output device 15 is an operation device such as buttons, a remote controller and a touch sensor. The input/output device 15 receives an operation of a user (driver or the like) and transfers the reception of the operation to the display control device 20.

Here, the constitution of the display control device 20 will be described with reference to FIG. 3. FIG. 3 is a diagram illustrating display areas and display guides provided in the displayable region 2 which is in the windshield 1 and arranged opposite to the driver, as shown in FIG. 1.

In the embodiment 1, the displayable region 2 is divided into five display areas 201 to 205. The leftmost display area 201 and the rightmost display area 205 of the displayable region 2 are a region for displaying warning information. The display area 202 is a region for displaying the vehicle information. The display area 203 is a region for displaying the navigation information. The display area 204 is a region for displaying the AV information. In addition, at the lower part of the displayable region 2, the display guides 211 to 215 indicating the display areas 201 to 205 respectively are displayed.

Thus, the display areas are set in the displayable region 2 for the individual type of information to be displayed. Incidentally, the description above is only an example, and does not limit the number of the display areas and the types of information to be displayed in the display areas.

The type definition storage 21 stores the type definition information that defines the types of information to be displayed in the display areas 201 to 205. In this example, as the types of information, there are five types of information in total: first warning information to be displayed in the display area 201; the vehicle information to be displayed in the display area 202; the navigation information to be displayed in the display area 203; the AV information to be displayed in the display area 204; and second warning information to be displayed in the display area 205.

The type definition information, for example, defines information about an obstacle in the surroundings of the vehicle as the warning information. Furthermore, the type definition information defines information about an obstacle detected on the left side of the vehicle as the first warning information to be displayed in the display area 201, and defines information about an obstacle detected on the right side of the vehicle as the second warning information to be displayed in the display area 205.

Incidentally, information that is classified as the warning information is not limited to the information about an obstacle, but may be provided as the information on the failure of the vehicle or the information indicating that the amount of the remaining fuel becomes less than a specified value.

In addition, the type definition information defines information about the vehicle such as a vehicle speed as the vehicle information. Incidentally, information that is classified as the vehicle information is not limited to the information about the vehicle speed, but can be provided as the information about the ON state or OFF state of the right and left blinker switches, the information on the shift position of the gear lever, the information about the engine speed in the case of a gasoline-powered car, and the information about the power consumption in the case of an electric vehicle.

In addition, the type definition information defines information about navigation guidance as the navigation information.

In addition, the type definition information defines information about the AV, which includes the title of music being reproduced at present, as the AV information.

Incidentally, the description above is only an example, and does not limit a method of classifying the pieces of information. In addition, a user may change definitions as to what information is classified and what type is applied to the information. In that case, the information setting unit 26 receives the type definition information the user inputs via the input/output device 15 and stores the type definition information in the type definition storage 21.

The type deciding unit 22 receives various pieces of information output from the obstacle detector 11, the vehicle speed sensor 12, the navigation system 13, and the AV system 14. On the basis of the type definition information stored in the type definition storage 21, the type deciding unit 22 decides which type of information received corresponds to any of the types of first warning information, second warning information, vehicle information, navigation information and AV information. The type deciding unit 22 outputs the information and its type to the display controller 25.

Incidentally, if the information received by the type deciding unit 22 does not correspond to any of the types, the type deciding unit 22 can decide that the information should not be displayed and discard the information.

The display information storage 23 stores the display information necessary for displaying the various pieces of information received from the external apparatus in the display areas 201 to 205. The display information can be a figure, letters, or a combination of the figure and letters. For example, letters "60 km/h" and "350 meters", and the arrow of a right turn shown in FIG. 1 represent the display information. It is assumed that the display information is prepared for each type.

Incidentally, a user may alter the display information. In that case, the information setting unit 26 receives the display information the user inputs via the input/output device 15 and stores the display information in the display information storage 23.

The display guide storage 24 stores the information necessary for displaying the display guides 211 to 215. The display information can be a figure, letters, or a combination of the figure and letters. The display guides 211 to 215 shown in FIGS. 1 and 3 are arranged in the shape of a belt.

Incidentally, a user may alter display mode such as types of display guides (a figure, letters, or in the case of the figure, the shape of the figure is considered), color, and display positions. In that case, the information setting unit 26 receives the display mode of the display guide the user input via the input/output device 15 and stores the display mode in the display information storage 23.

The display controller 25 receives the information and type output from the type deciding unit 22. The display controller 25 acquires from the display information storage 23 the display information corresponding to the type of information received, and instructs the head-up display 10 to display the display information in the display area corresponding to the type. In addition, regardless of whether there is a piece of information to be displayed in the display areas 201 to 205, the display controller 25 acquires the information about the individual display guides indicating the display areas 201 to 205 from the display guide storage 24, and instructs the head-up display 10 to display the display guides 211 to 215.

Next, the operation of the display control device 20 will be described.

FIG. 4 is a flowchart illustrating the operation of the display control device 20. In the following, the operation of the display control device 20 will be described with a display example in the displayable region 2 shown in FIG. 5. Incidentally, the display control device 20 operates in response to a change in the information received from the external apparatus as a trigger and repeats the operation shown by the flowchart without pause. This enables immediate display in accordance with occurrence of a warning, a change in the vehicle speed, and the like.

First, when the type deciding unit 22 receives the information from the external apparatus such as the obstacle detector 11, vehicle speed sensor 12, navigation system 13 and AV system 14 ("YES" at step ST11), the type deciding unit 22 decides the type of information received on the basis of the type definition information in the type definition storage 21 (step ST12).

Figure 5:
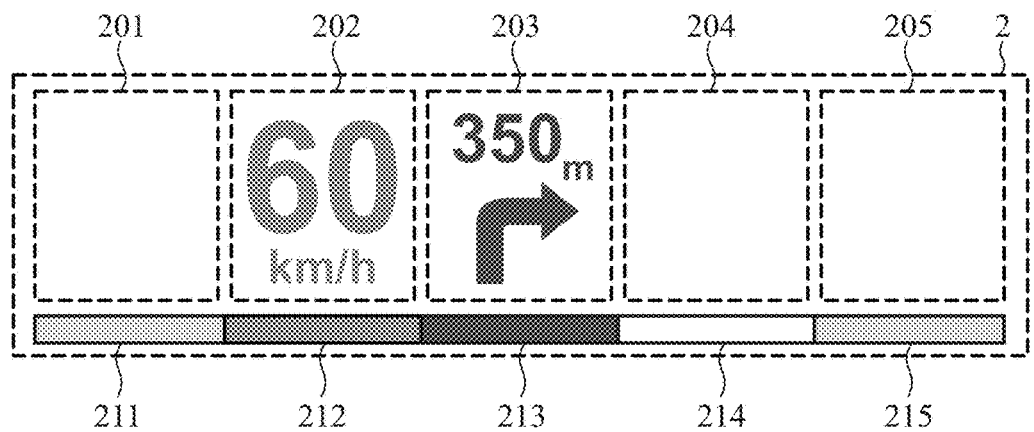
FIG. 5 is a diagram showing a display example in a displayable region of the embodiment 1.

In the example of FIG. 5, it is assumed that the type deciding unit 22 receives the information indicating that the vehicle speed is 60 kilometers an hour from the vehicle speed sensor 12, and the information indicating that the vehicle is to turn to the right 350 meters ahead from the navigation system 13. In that case, the type deciding unit 22 decides that the information indicating that the vehicle speed is 60 kilometers an hour as the vehicle information, and that the information indicating the right turn 350 meters ahead as the navigation information.

After that, the type deciding unit 22 decides whether or not the information whose type is decided is information to be displayed on the head-up display 10 (step ST13). When there is the information to be displayed on the head-up display 10 ("YES" at step ST13), the type deciding unit 22 outputs the information to the display controller 25.

In the example of FIG. 5, since the vehicle information and navigation information are present, the type deciding unit 22 decides that the pieces of information to be displayed on the head-up display 10 are present and supplies the vehicle information and navigation information to the display controller 25.

When there is the information to be displayed on the head-up display 10 ("YES" at step ST13), the display controller 25 acquires from the display information storage 23 the display information corresponding to the information received from the type deciding unit 22 and instructs the head-up display 10 to display the acquired display information in the display area corresponding to the type of display information (step ST14).

In the example of FIG. 5, the display controller 25 acquires the display information containing the letters "60 km/h" from the display information storage 23 on the basis of the vehicle information indicating that the vehicle speed is 60 kilometers an hour, and instructs the head-up display 10 to display the display information in the display area 202. Likewise, the display controller 25 acquires the display information containing the letters "350 m" and the arrow of the right turn from the display information storage 23 on the basis of the navigation information indicating the right turn 350 meters ahead and instructs the head-up display 10 to display the display information in the display area 203.

After that, the display controller 25 acquires from the display information storage 23 the information about the display guides corresponding to all the display areas of the displayable region 2, and instructs the head-up display 10 to display the acquired information about the display guides on the lower side of the individual display areas (step ST15).

In the example of FIG. 5, the display controller 25 instructs the head-up display 10 to display the display guides 211 to 215 in the shape of a belt on the lower side of the display areas 201 to 205.

According to the processing described above, the vehicle information "60 km/h" is displayed in the display area 202, and the navigation information "350 m" and the arrow indicating the right turn is displayed in the display area 203 as shown in FIG. 5. In addition, regardless of whether the display information is present or not, the display guides 211 to 215 indicating the display areas 201 to 205 are displayed on the lower side of the display areas 201 to 205, respectively.

In contrast, when the type deciding unit 22 receives no information from the external apparatus ("NO" at step ST11), or when there is no information to be displayed on the head-up display 10 ("NO" at step ST13), the display controller 25 executes the processing at step ST15 and instructs the head-up display 10 to display the display guides 211 to 215.

Regardless of whether or not the display information is present in the display areas 201 to 205, displaying all the display guides 211 to 215 enables the driver to recognize the displayable region 2 of the head-up display 10 more easily, and makes it easier for the driver to find which portion of the windshield 1 is used to display the information. In addition, since the display guides 211 to 215 are displayed even in the case where there is no display information, the driver can easily anticipate what information is displayed and which portion of the windshield is used to display information, thereby preventing the driver from overlooking the information.

Here, a modification regarding the mode of the display information and display guides will be described.

The display guides 211 to 215 shown in FIGS. 3 and 5 vary their colors in accordance with the types of information to be displayed in the display areas 201 to 205. Furthermore, the colors of the information to be displayed in the display areas 201 to 205 may be made identical to the colors of the corresponding display guides 211 to 215, so that the driver can easily distinguish the types of display information.

To achieve this, it may be configured such that the display information storage 23 stores in advance the pieces of display information, each of which includes information on a different color for each type, or that the display controller 25 alters the colors included in the display information in accordance with the types each time. Likewise, it may be configured such that the display guide storage 24 stores in advance the display guides, each of which has a different color for each type, or that the display controller 25 alters the colors of the display guides in accordance with the types each time.

Although not shown in the drawings, the positions where the display guides 211 to 215 are displayed are not limited to the lower side of the display areas 201 to 205, but may be the upper side, right side, left side or a combination of them.

Figure 6:
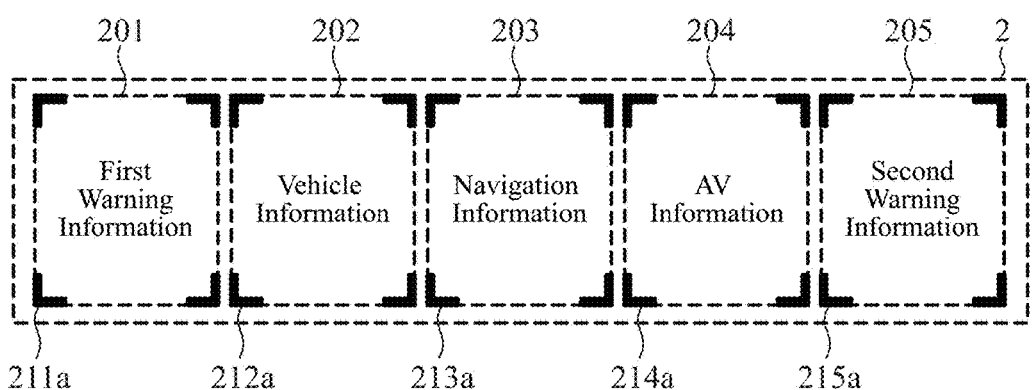
FIG. 6 is a diagram showing a modification of the display guides of the embodiment 1.
Figure 7:
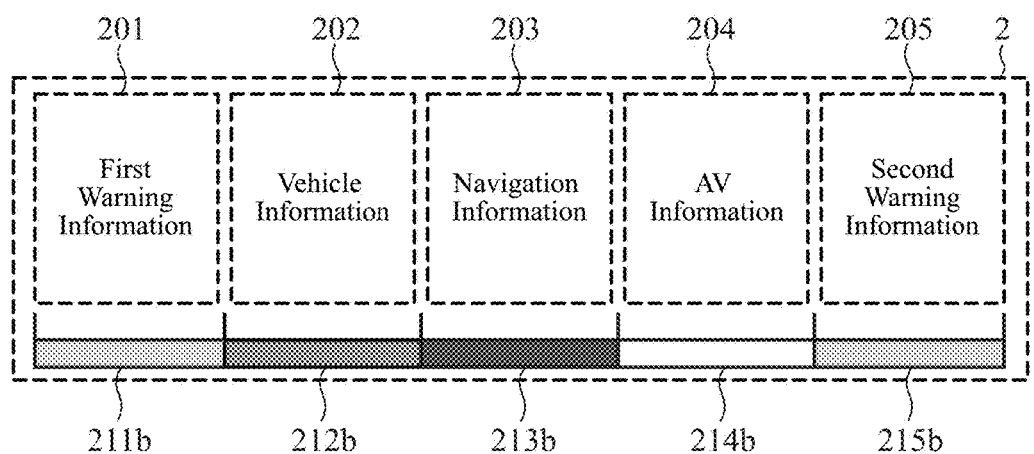
FIG. 7 is a diagram showing a modification of the display guides of the embodiment 1.
Figure 8:
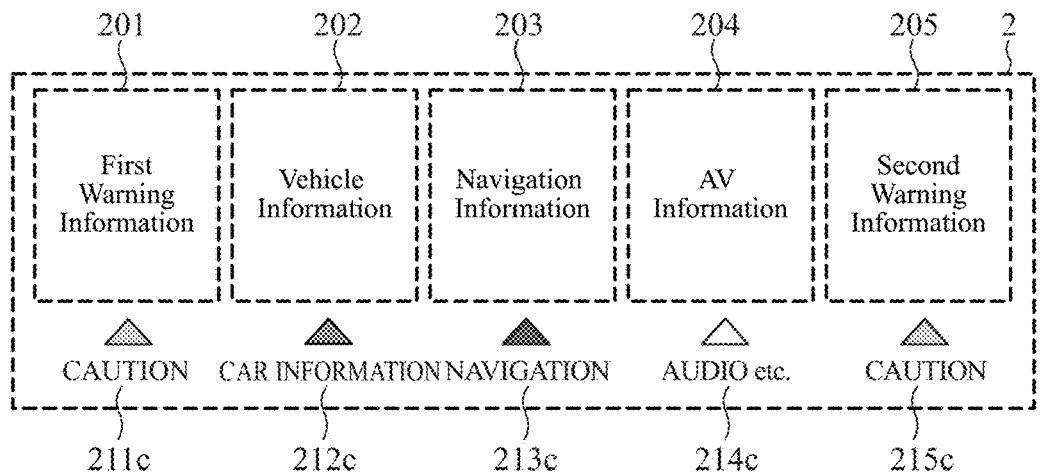
FIG. 8 is a diagram showing a modification of the display guides of the embodiment 1.

FIGS. 6 to 8 show modifications of the display guides.

Although FIG. 5 shows the belt-like display guides 211 to 215, the modification of FIG. 6 shows the display guides 211a to 215a with square brackets at the four corners of each of the display areas 201 to 205.

The modification of FIG. 7 shows as the display guides 211b-215b, a pattern in which lines are added to the initial positions and final positions of the individual divisions of the belt.

The modification of FIG. 8 shows as the display guides 211c-215c, triangular arrows together with words such as "CAUTION" indicating the types of information.

Furthermore, a combination of a plurality of display modes shown in FIGS. 5 to 8 can be used such as combining the display guides 211a to 215a of FIG. 6 with the display guides 211c-215c of FIG. 8, for example.

Figure 9:
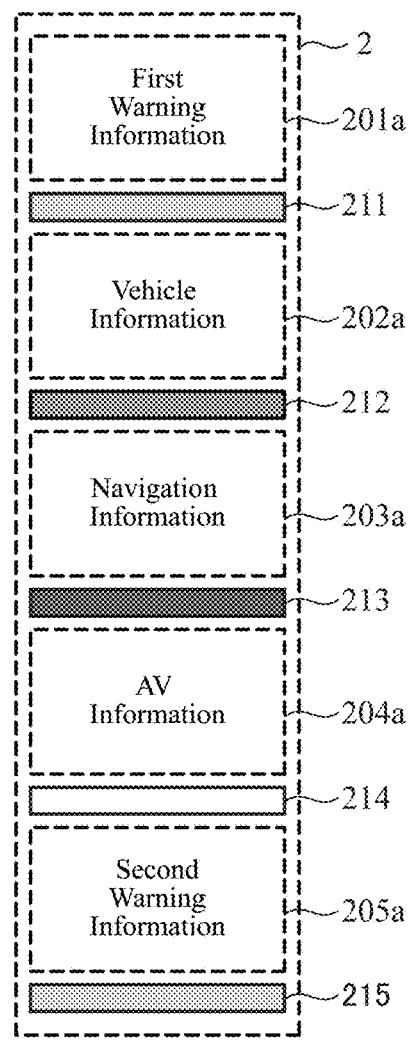
FIG. 9 is a diagram showing a modification of the display guides of the embodiment 1.
Figure 10:
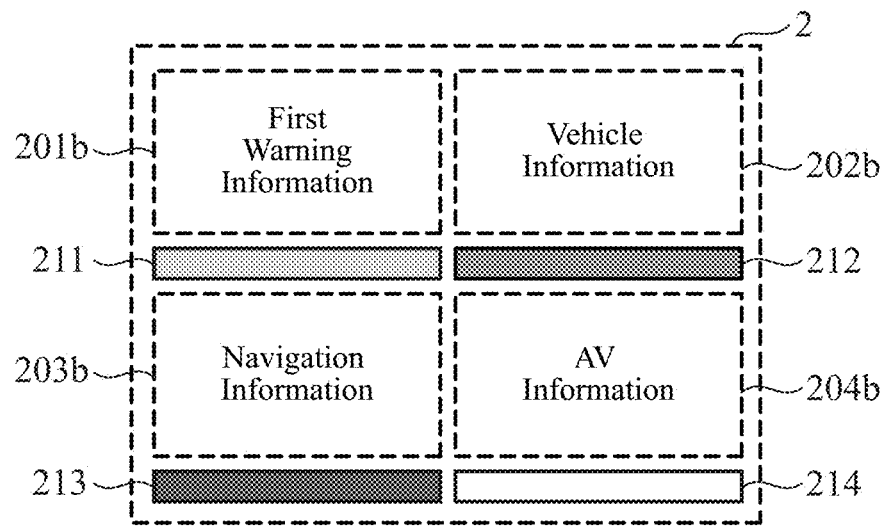
FIG. 10 is a diagram showing a modification of the display guides of the embodiment 1.

FIGS. 9 and 10 show modifications of the display areas.

In FIGS. 5 to 8, although the belt-like displayable region 2 is divided into five divisions, and the display areas 201 to 205 are arranged in a row, FIG. 9 shows a modification in which the longitudinally extended displayable region 2 is divided into five divisions, and the display areas 201a to 205a are arranged in a column.

FIG. 10 shows a modification in which the displayable region 2 is divided longitudinally and horizontally to form the display areas 201b to 204b arranged lengthwise and widthwise, respectively.

Thus, the number of display areas divided in the longitudinal and horizontal directions can be changed.

Figure 11:
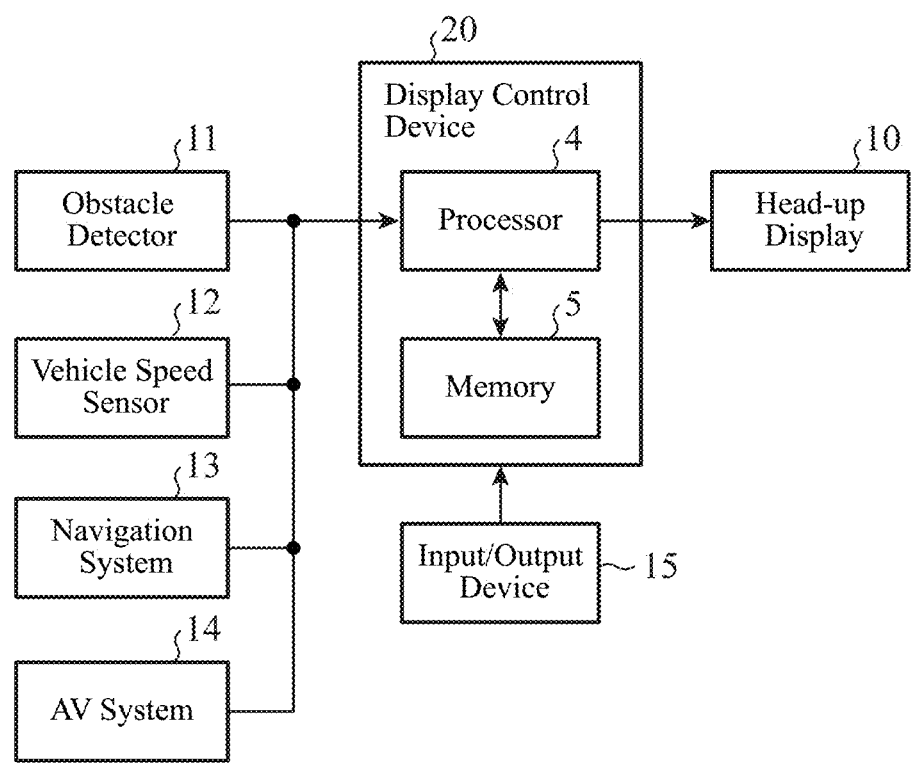
FIG. 11 is a block diagram showing the hardware configuration of the on-vehicle display system using the display control device of the embodiment 1.

Next, a hardware configuration of the on-vehicle display system will be described. FIG. 11 is a block diagram showing a hardware configuration of the on-vehicle display system.

The type definition storage 21, display information storage 23 and display guide storage 24 shown in FIG. 2 correspond to a memory 5 shown in FIG. 11. The type deciding unit 22, display controller 25 and information setting unit 26 are implemented by a processor 4 that executes programs stored in the memory 5. The processor 4 is a processing circuit such as a CPU or a system LSI. In addition, a plurality of processors and a plurality of memories can execute the foregoing functions in cooperation.

As described above, according to the embodiment 1, the display control device 20 is configured in such a manner as to comprise the type deciding unit 22 for deciding the types of display information; and the display controller 25 for causing the head-up display 10 to display the display information with the types decided by the type deciding unit 22 in the display areas 201 to 205 of the head-up display 10, which are provided for the individual types of display information, and for causing the head-up display 10 to display the display guides 211 to 215 indicating the display areas 201 to 205 regardless of the presence or absence of the display information. For this reason, the display control device makes it easier for a driver to anticipate what information is displayed and which portion of the head-up display is used.

In addition, according to the embodiment 1, the display control device can change the colors of the display guides for the individual types of display information to be displayed in the display areas. In addition, the display control device can match the colors of the display guides indicating the display areas to the colors included in the display information and displayed in the display areas. This enables the driver to identify the information such as the navigation information and the warning information, prevents the driver from overlooking the information, and alleviates the driver's uneasiness that he or she might have overlooked the information.

In addition, according to the embodiment 1, the display guides can be formed by a figure, letters or a combination of the figure and letters. When letters are displayed to indicate the types of information as the display guides, it becomes still easier for the driver to anticipate what information is displayed and which portion of the display is used.

Embodiment 2

In the foregoing embodiment 1, the size of the display areas 201 to 205 in the displayable region 2 is fixed as shown in FIG. 3. In contrast with this, the sizes of the display areas 201 to 205 are variable in the embodiment 2.

Figure 12:
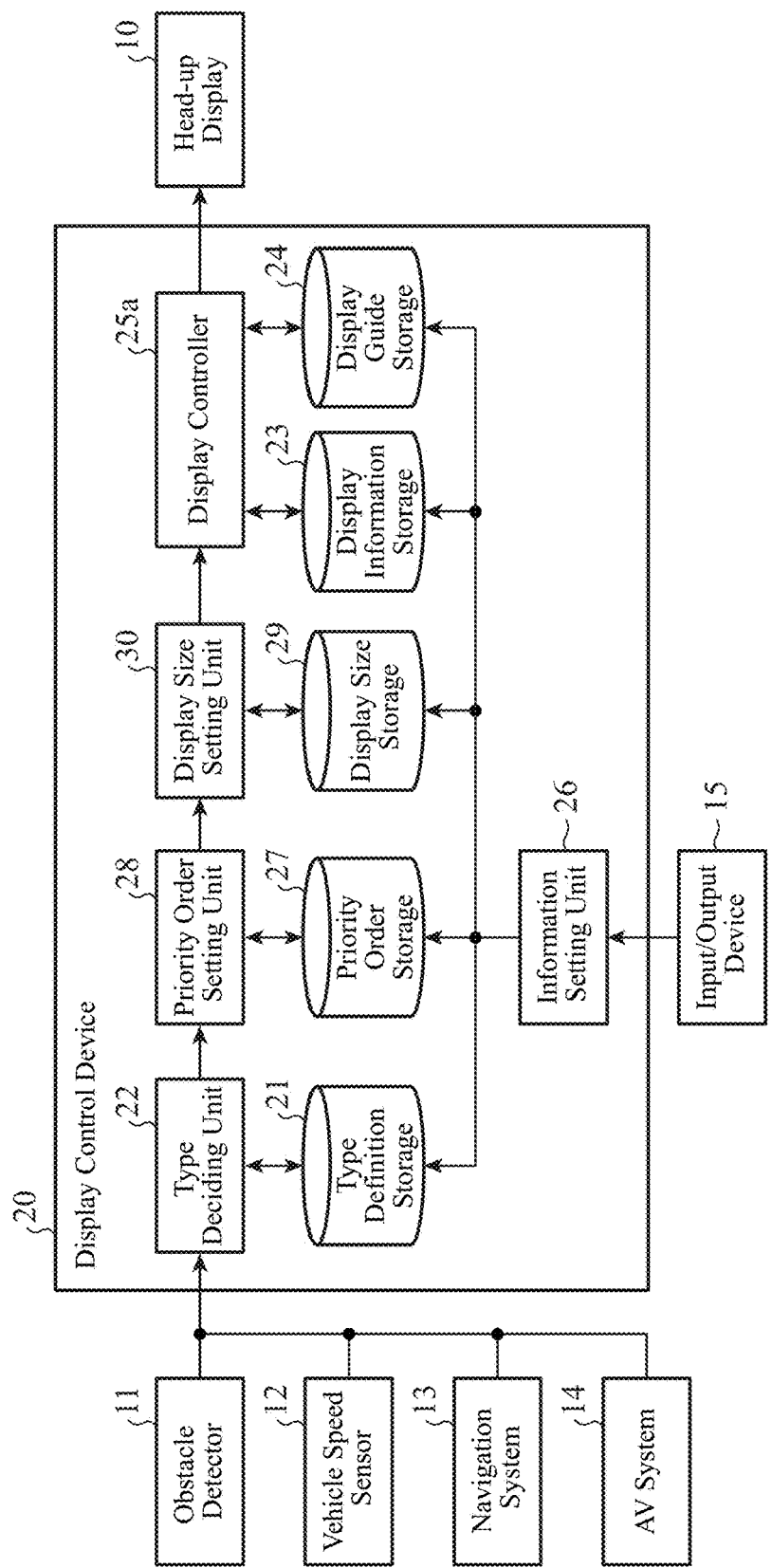
FIG. 12 is a block diagram showing a configuration of an on-vehicle display system using a display control device according to an embodiment 2 of the present invention.

FIG. 12 is a block diagram showing a configuration of a display control device 20 of the embodiment 2. The display control device 20 of the embodiment 2 comprises, in addition to the configuration of the foregoing embodiment 1, a priority order storage 27, a priority order setting unit 28, a display size storage 29, and a display size setting unit 30. The priority order storage 27 and the display size storage 29 correspond to the memory 5 of FIG. 11. The priority order setting unit 28 and the display size setting unit 30 are implemented by the processor 4 of FIG. 11, which executes programs stored in the memory 5. In FIG. 12, the same or corresponding portions as those of FIG. 2 are designated by the same reference numerals, and their description will be omitted.

As in FIG. 2 of the foregoing embodiment 1, the display control device 20 of the embodiment 2 is also connected to the external apparatus such as the obstacle detector 11, vehicle speed sensor 12, navigation system 13, and AV system 14. The display control device 20 generates the display information from the information output from the external apparatus and causes the head-up display 10 to display the display information. In addition, the input/output device 15 for receiving an operation of a user (such as a driver) is connected to the display control device 20.

The embodiment 2 will be described with reference to the displayable region 2 of FIG. 3.

The priority order storage 27 stores priority information that indicates the correspondence between the types and the priorities of the information to be displayed in the display areas 201 to 205. For example, the priority of the navigation information is set at the first place, and the priorities of the remaining types (first warning information, second warning information, vehicle information, and AV information) are set at the second place.

The priorities can be changed in accordance with a combination of pieces of information to be displayed in the display areas 201 to 205.

For example, in the case in which a vehicle approaches an intersection at which the vehicle is expected to make a turn (for example, in the case in which the vehicle comes to 100 meters before the intersection), it is important to highlight the navigation information on which the driver is guided to make a turn. For this reason, when the distance up to the target intersection, to which the navigation system 13 guides the driver, becomes less than a threshold (for example, 100 meters), the priority information to the effect that the priority of the navigation information should be set at the first place is defined.

In addition, when the vehicle is expected to turn left at the foregoing intersection, the priority information to the effect that the priority of the first warning information is set at the second place is defined. When the vehicle is expected to turn right at the intersection, the priority information to the effect that the priority of the second warning information is set at the second place is defined.

For example, when there is an obstacle on the left side of the vehicle in making a left turn, it is important to warn the driver about the obstacle. For this reason, when the information about the ON state of the left blinker switch and the information that an obstacle is detected on the left side of the vehicle are input to the display control device 20, the priority information to the effect that the priority of the first warning information about the obstacle detected on the left side of the vehicle is set at the first place is defined.

In contrast, when the information about the ON state of the right blinker switch and the information that an obstacle is detected on the right side of the vehicle are input to the display control device 20, the priority information to the effect that the priority of the second warning information about the obstacle detected on the right side of the vehicle is set at the first place is defined.

While the vehicle is traveling, for example, information about drive support such as the navigation information, warning information and vehicle information is more important than the AV information. For this reason, during traveling, the priority information to the effect that the information about the drive support is given a higher priority than the AV information is defined. In contrast, while the vehicle is stopped, the information about the drive support is less important. Accordingly, the priority information to the effect that the information about the drive support is given a lower priority than the AV information is defined.

Whether the vehicle is traveling or stopped can be decided from the information about the vehicle speed from the vehicle speed sensor 12, or decided from the information about the shift position of the gear lever, when the information is input to the display control device 20.

Incidentally, the description here is only an example, and does not limit the correspondence between the types of information and the priorities.

In addition, it may be such that a user changes the correspondence between the types of information and the priorities. In this case, the information setting unit 26 receives the correspondence between the types of information and the priorities the user inputs via the input/output device 15, and stores the correspondence in the priority order storage 27.

The display size storage 29 stores display size information indicating the correspondence between the priorities and the sizes of the display areas. The display size information is defined in such a manner that the size of the display area for displaying the information of the type with a high priority is increased, and that the size of the display area for displaying the information of the type with a low priority is reduced. Accordingly, the information is displayed on a larger scale in the displayable region 2 as the degree of priority included in the type of information is increased, which makes it easier for the user to visually verify the information.

Figure 13:
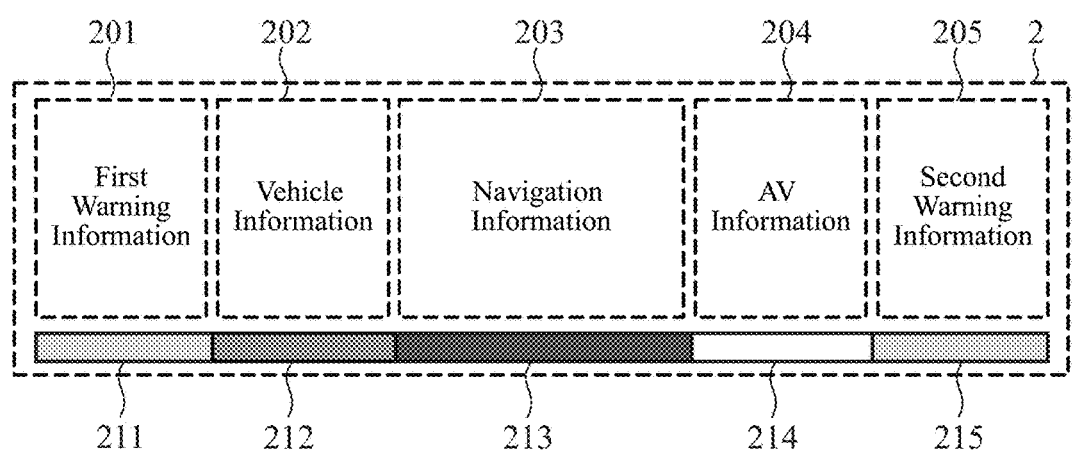
FIG. 13 is a diagram illustrating an example of display areas and display guides of the embodiment 2.

Concerning the displayable region 2 in the foregoing embodiment 1, the ratios of the widths of the display areas 201 to 205 are fixed at 1:1:1:1:1. In contrast with this, in the embodiment 2, the display size information is defined in such a manner that the ratios of the widths of the display areas are 1:0.6:0.5:0.4:0.3 in accordance with the priorities, that is, the order of the first place, second place, third place, fourth place and fifth place, thereby varying the sizes of the display areas in accordance with the priorities of the types. For example, when the priority of the navigation information is the first place and the priorities of the remaining types are the second place, the ratio between the width of the display area 203 of the navigation information and the width of the four remaining display areas 201, 202, 204 and 205 is represented as 1:0.6. FIG. 13 shows the displayable region 2 in this case.

Incidentally, although the example defines the sizes of the display areas by a ratio, this is not essential. For example, the sizes of the display areas can be defined in advance for all the combinations of the types and the priorities.

In addition, it may be such that a user changes the sizes of the display areas (or ratios) for the individual priorities. In that case, the information setting unit 26 receives the sizes (or ratios) of the display areas for the individual priorities the user input via the input/output device 15 and stores the sizes in the display size storage 29.

Figure 14:
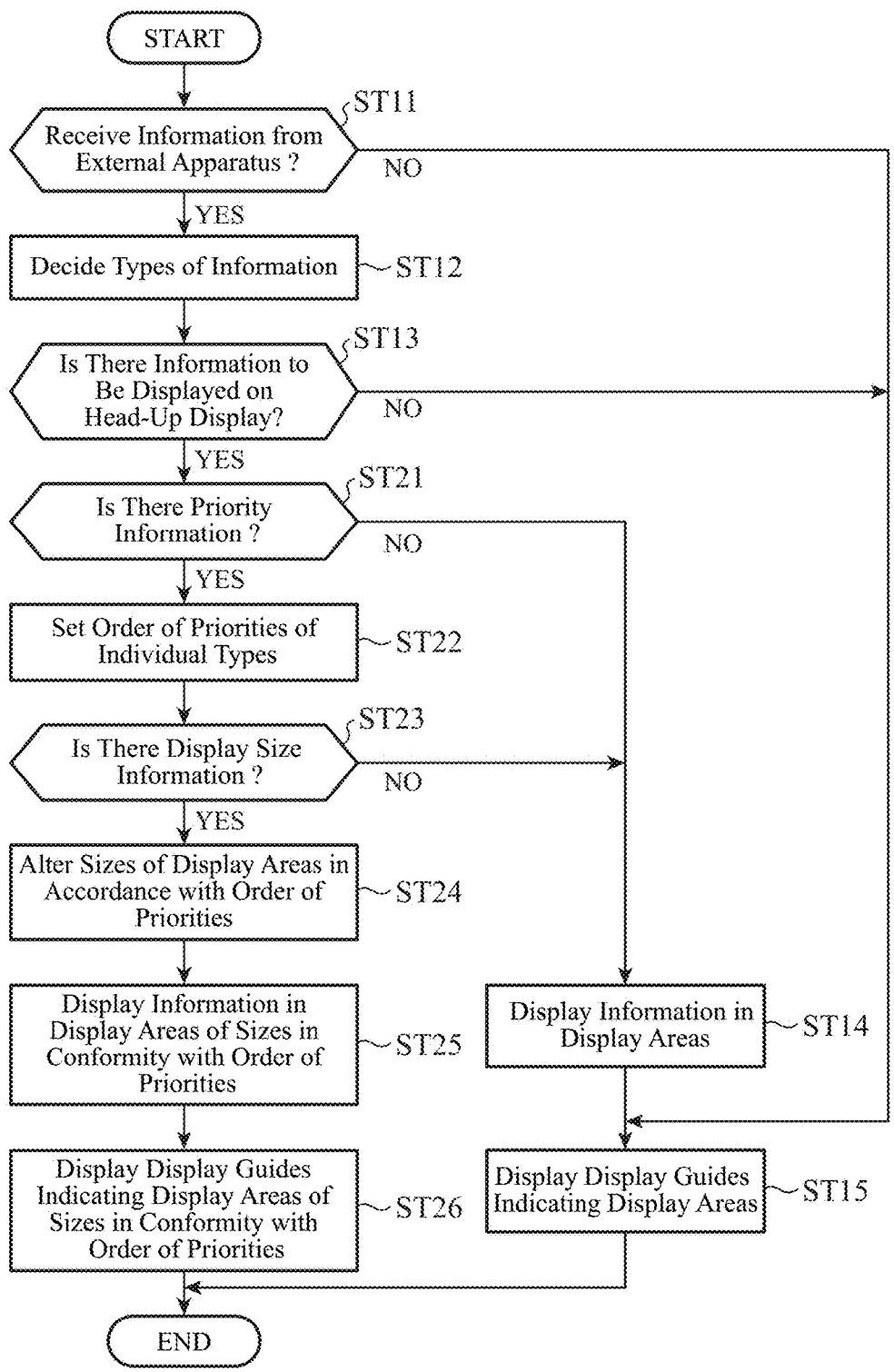
FIG. 14 is a flowchart illustrating the operation of the display control device of the embodiment 2.

Next, the operation of the priority order setting unit 28, the display size setting unit 30, and the display controller 25*a* will be described with reference to the flowchart of FIG. 14. The display control device 20 uses a change in the information received from the external apparatus as a trigger, and repeats the operation shown by the flowchart without pause. Since the steps ST11 to ST13 of FIG. 14 are the same as the steps ST11 to ST13 shown in FIG. 4, their descriptions will be omitted.

When the type deciding unit 22 decides that there are pieces of information to be displayed on the head-up display 10 ("YES" at step ST13), the type deciding unit 22 outputs the information and types to the priority order setting unit 28.

The priority order setting unit 28 receives the information and types output from the type deciding unit 22. The priority order setting unit 28 checks whether the priority information is stored or not by referring to the priority order storage 27 (step ST21). When the priority order storage 27 stores the priority information ("YES" at step ST21), the priority order setting unit 28 acquires the priority information, compares the information received from the type deciding unit 22 with the priority information, and sets the priorities of the individual types of information (step ST22). Then, the priority order setting unit 28 outputs the priority order set by itself to the display size setting unit 30 together with the information and types received from the type deciding unit 22.

In the case where the priority information is not stored in the priority order storage 27 stores ("NO" at step ST21), the priority order setting unit 28 outputs the information and types received from the type deciding unit 22 to the display size setting unit 30.

The display size setting unit 30 receives the information, types, and priority order output from the priority order setting unit 28. As for the priority order, there is a case where the priority order is added or a case where the priority order is not added.

When the priority order is added, the display size setting unit 30 checks whether or not the display size information is stored by referring to the display size storage 29 (step ST23). When the display size storage 29 stores the display size information ("YES" at step ST23), the display size setting unit 30 acquires the display size information, and sets the sizes of the display areas in accordance with the priorities (step ST24). Then, the display size setting unit 30 adds the sizes of the display areas to the information and types received from the priority order setting unit 28, and outputs the information, types, and sizes to the display controller 25*a*.

In the case where the priority order is not added ("NO" at step ST21), the display size setting unit 30 outputs the information and types received from the priority order setting unit 28 to the display controller 25*a*.

The display controller 25*a* receives the information, the types, and the sizes of the display areas the display size setting unit 30 outputs. There are some cases where the sizes of the display areas are added or not. When the sizes of the display areas are added, the display controller 25*a* uses the sizes, but when the sizes of the display areas are not added, the display controller 25*a* uses the size ratios (for example, 1:1:1:1:1) which have been set in advance in the display controller 25*a*.

In the case where the sizes of the display areas are added, the display controller 25*a* acquires from the display information storage 23 the pieces of display information corresponding to the types of information received from the display size setting unit 30, and changes the sizes of the display information in accordance with the sizes of the display areas corresponding to the types at step ST25. Then, the display controller 25*a* instructs the head-up display 10 to display the pieces of display information, the sizes of which are changed, in the display areas corresponding to the types of display information.

After that, the display controller 25*a* acquires from the display guide storage 24 the information on the display guides corresponding to all the display areas of the displayable region 2, and changes the sizes of the display guides in accordance with the sizes of the individual display areas. Then, the display controller 25*a* instructs the head-up display 10 to display the individual display guides, the sizes of which are changed, on the lower side of the corresponding individual display areas (step ST26).

When the sizes of the display areas are not added ("NO" at step ST21 or "NO" at step ST23), as is the same with the foregoing embodiment 1, the display controller 25*a* acquires from the display information storage 23 the pieces of display information corresponding to the types of information received from the display size setting unit 30, and instructs the head-up display 10 to display the display information without changing the size (step ST14).

After that, as is the same with the foregoing embodiment 1, the display controller 25*a* acquires from the display guide storage 24 the pieces of display guide information corresponding to all the display areas of the displayable region 2, and instructs the head-up display 10 to display the display guide information without changing the size (step ST15).

At steps ST14 and ST15, since the sizes of the display areas and display guides are not changed, the display areas 201 to 205 have the size ratios 1:1:1:1:1 as shown in FIG. 3.

Next, a concrete example of the embodiment 2 will be described.

When the type deciding unit 22 receives the vehicle information from the vehicle speed sensor 12 and receives the navigation information from the navigation system 13 ("YES" at step ST11), the type deciding unit 22 decides their types (step ST12) and decides that the pieces of information received are information to be displayed on the head-up display 10 ("YES" at step ST13). Here, when the priority order storage 27 stores the priority information which defines that the navigation information has the first priority, and that the other types have the second priority ("YES" at step ST21), the priority order setting unit 28 gives, in accordance with the priority information, the first priority to the navigation information, and the second priority to information of the remaining types including the vehicle information (step ST22).

When the display size storage 29 stores the display size information which defines that the size ratios of the display areas, which are based on the priority order of the first place, second place, third place, fourth place, and fifth place, are represented as 1:0.6:0.5:0.4:0.3 ("YES" at step ST23), the display size setting unit 30 sets the sizes of the individual display areas in such a manner that the size ratio of the display area 203 of the navigation information is 1, and the size ratio of the other display areas 201, 202, 204 and 205 is 0.6 (step ST24). The display controller 25a instructs the head-up display 10 to display the pieces of display information and the display guides with the sizes matching the individual display areas (steps ST25 and ST26). As a result, the displayable region 2 of the windshield 1 is illustrated in a state shown in FIG. 13. In FIG. 13, the display area 203 for displaying the navigation information with the first priority is wider than the other display areas 201, 202, 204 and 205.

After that, assume that the type deciding unit 22 newly receives, in addition to the foregoing vehicle information and navigation information, the information about the detection of an obstacle on the left side of the vehicle from the obstacle detector 11 and the information about the ON state from the left blinker switch ("YES" at step ST11). The type deciding unit 22 decides that the type of information about the detection of the obstacle is the first warning information, and the information about the blinker switch is the vehicle information (step ST12), and decides that these pieces of information should be displayed on the head-up display 10 ("YES" at step ST13). Here, it is assumed that the priority order storage 27 stores the priority information defining that when the information indicating the ON state of the left blinker switch and the information indicating the detection of the obstacle on the left side of the vehicle are inputted, the first warning information is given the first priority, and the priorities of information of the other types are reduced one by one ("YES" at step ST21). Further, the priority order setting unit 28 gives, in accordance with the priority information, the first priority to the first warning information, changes the priority of the navigation information from the first place to the second place, and changes the priorities of pieces of information of the remaining types, which include the vehicle information, from the second place to the third place (step ST22).

Figure 15:
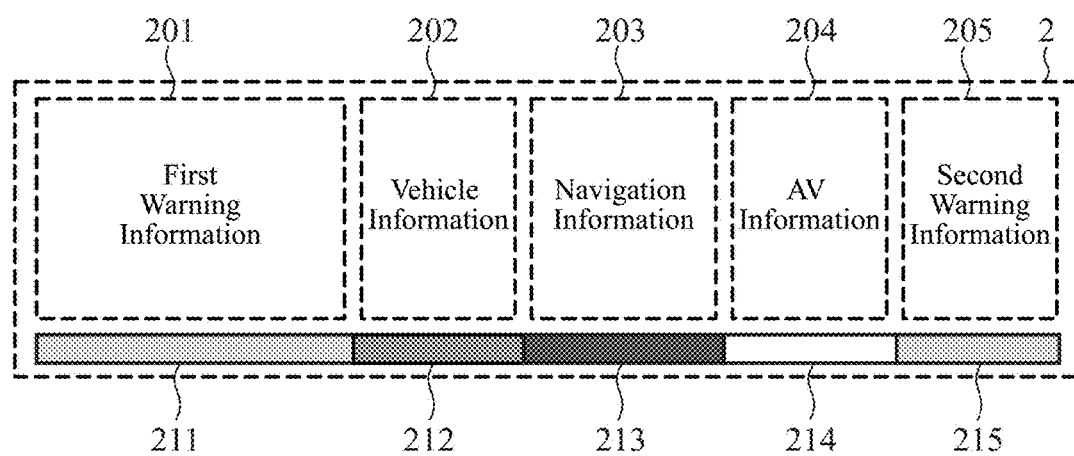
FIG. 15 is a diagram illustrating an example of the display areas and display guides of the embodiment 2.

In accordance with the display size information, the display size setting unit 30 sets the sizes of the individual display areas in such a manner that the size ratio of the display area 201 of the first warning information is 1, the size ratio of the display area 203 of the navigation information is 0.6, and the size ratio of the other display areas 202, 204 and 205 is 0.5 ("YES" at step ST23 and step ST24). The display controller 25a instructs the head-up display 10 to display the pieces of display information and display guides with the sizes matching the individual display areas (steps ST25 and ST26). As a result, the displayable region 2 of the windshield 1 is changed from the state shown in FIG. 13 to the state shown in FIG. 15. In FIG. 15, the display information indicating that the obstacle is detected on the left side of the vehicle is displayed in the widest display area 201, and the navigation information is displayed in the second widest display area 203. The remaining display areas 202, 204 and 205 are narrower than the display area 201 or 203.

As described above, according to the embodiment 2, the display control device 20 is configured to comprise the priority order setting unit 28 for setting the priorities of the individual types according to the content of the display information, and the display size setting unit 30 for setting the display sizes of the display areas 201 to 205 on the basis of the priorities of the individual types the priority order setting unit 28 sets. The display controller 25a is configured so as to change the sizes of the display areas 201 to 205 and the display guides 211 to 215 in conformity with the sizes the display size setting unit 30 sets. Displaying the information in accordance with the priorities enables the driver to readily grasp the information. In addition, even if the sizes of the display areas vary, the display guides are always displayed, so that the driver can easily anticipate what information is displayed and which portion of the display is used.

Incidentally, although the foregoing example represents the constitution in which the sizes of the pieces of display information is increased or decreased in conformity with the sizes of the display areas, this is not essential. For example, it may be configured to display detailed display information when the size of the display area is large or to display simple display information such as an icon when the size of the display area is small.

Embodiment 3

In the foregoing embodiments 1 and 2, the arrangement order of the display areas 201 to 205 of the displayable region 2 is fixed as shown in FIGS. 3 and 13. In contrast with this, the arrangement order of the display areas 201 to 205 is variable in the embodiment 3.

Figure 16:
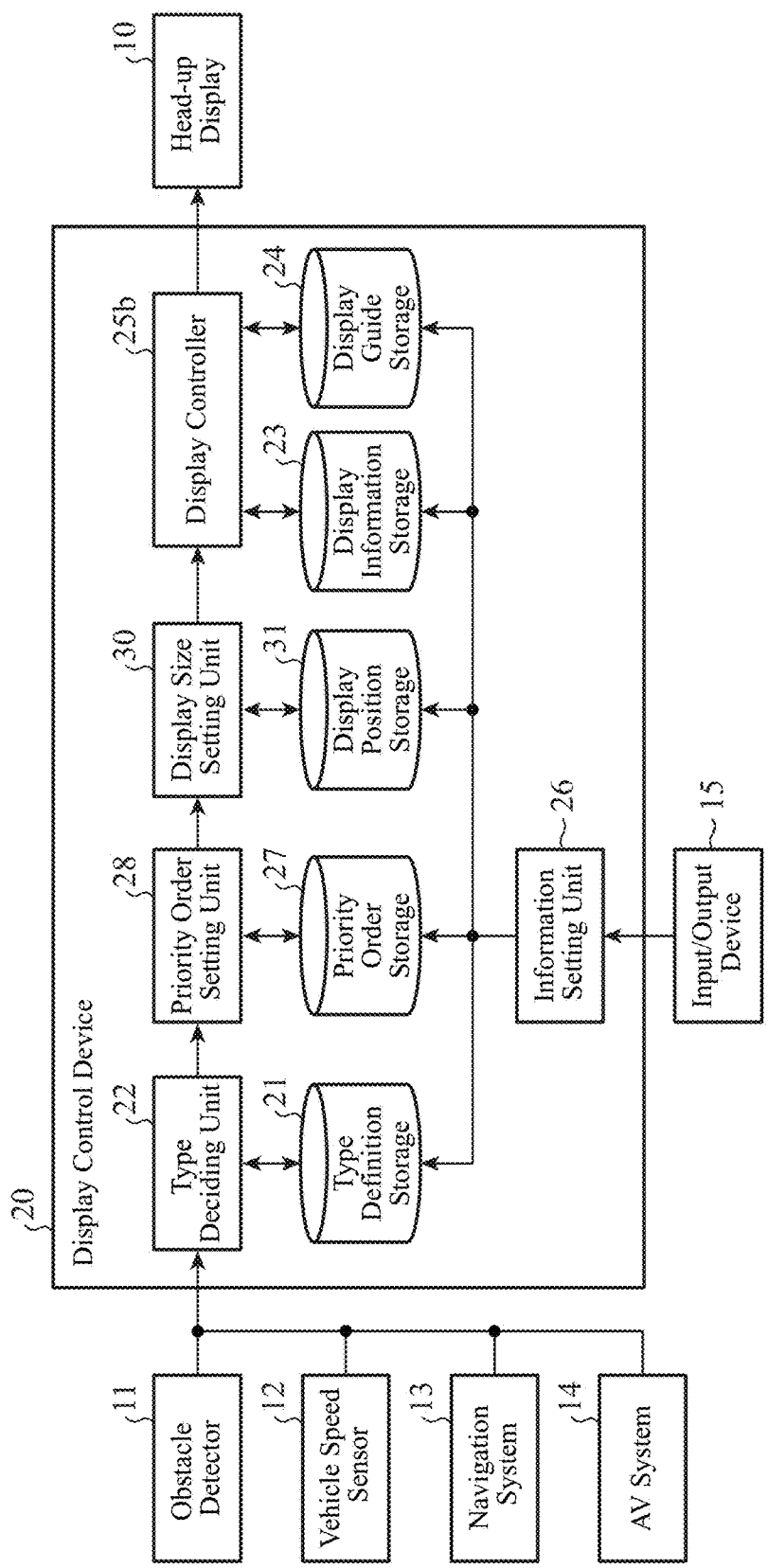
FIG. 16 is a block diagram showing a configuration of an on-vehicle display system using a display control device according to an embodiment 3 of the present invention.

FIG. 16 is a block diagram showing a configuration of the display control device 20 of the embodiment 3. The display control device 20 of the embodiment 3 comprises a display position storage 31 and a display position setting unit 32 in addition to the configurations of the foregoing embodiments 1 and 2. The display position storage 31 is located in the memory 5 of FIG. 11. The display position setting unit 32 is implemented by the processor 4 of FIG. 11 which executes a program stored in the memory 5. In FIG. 16, the same or corresponding portions as those of FIG. 2 and FIG. 12 are designated by the same reference numerals and their description will be omitted.

As in FIG. 2 of the foregoing embodiment 1, the display control device 20 of the embodiment 3 is also connected to the obstacle detector 11, vehicle speed sensor 12, navigation system 13 and AV system 14 working as the external apparatus, and the display control device 20 creates the pieces of display information from the information output from the external apparatus and causes the head-up display 10 to display the display information. In addition, the display control device 20 is also connected with the input/output device 15 for receiving an operation of a user (such as a driver).

The embodiment 3 will be described below with reference to the displayable region 2 of FIG. 3.

The display position storage 31 stores the display position information indicating the correspondence between the priorities of the types of information and the positions of the display areas. Assume that the display position information is defined such that a display area for displaying the information of a type with a high priority is located at a position a user can readily watch, and a display area for displaying the information of a type with a low priority is located at a position the user cannot readily watch. This enables the user to more readily look at the information of the type with a higher priority, and to visually verify more easily.

Figure 17A:
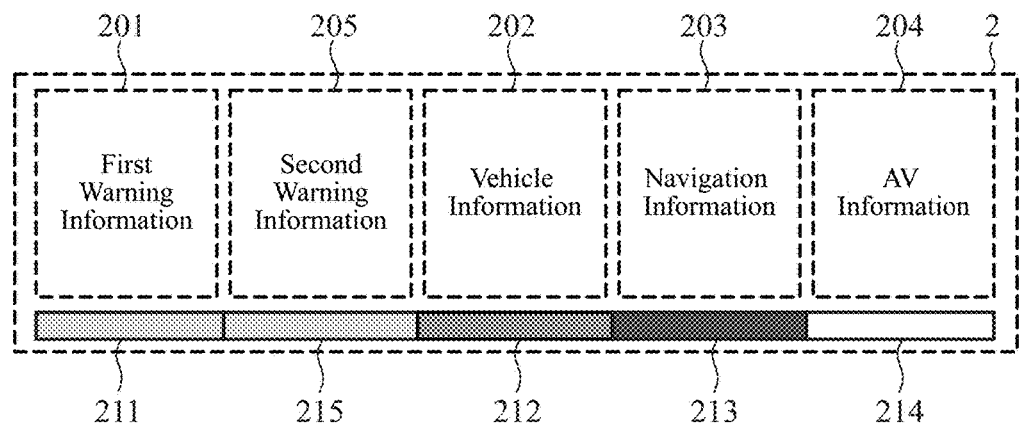
FIGS. 17A to 17C are diagrams illustrating display position information of the embodiment 3.
Figure 17B:
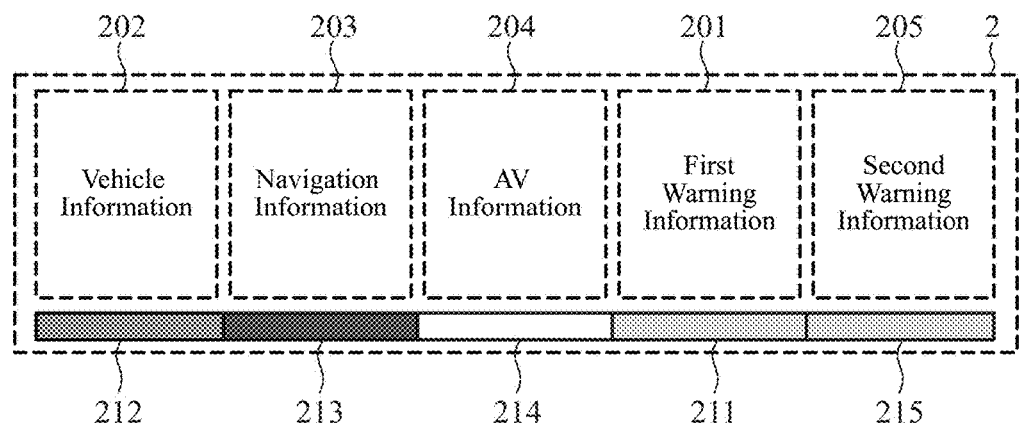
Figure 17C:
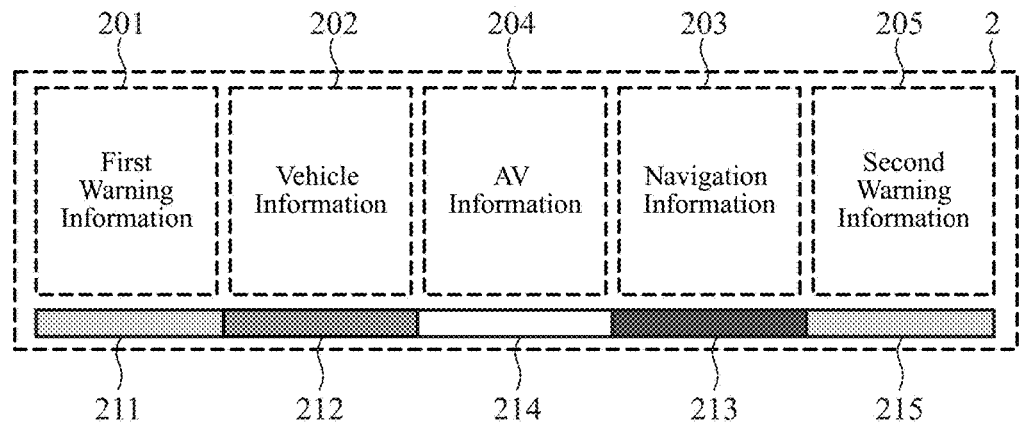

Here, FIGS. 17A, 17B, and 17C show an example of the display position information. In the examples, a user is supposed to be a driver. As for the first warning information, since the first warning information is the information about an obstacle detected on the left side of the vehicle, displaying the first warning information on the left side with respect to the driver enables the driver to readily look at the display when the driver turns his face to the left. In addition, adjusting the display direction of the warning to the detection direction of the obstacle enables the driver to intuitively grasp the content of the information. Thus, in FIG. 17A, when the priority of the first warning information is higher than the priorities of the other types, the display position information is defined in such a manner as to locate the display area 201 of the first warning information at the leftmost position of the displayable region 2. In addition, in the example of FIG. 17A, placing the display area 201 for displaying the first warning information and the display area 202 for displaying the second warning information side by side and expanding the display areas for warning make it possible to attract the attention of the driver. As for the positions of the display areas 202, 203 and 204 shown in FIG. 17A, they are only an example, and it is sufficient to define the positions corresponding to the priorities of the types of information.

In contrast, when the priority of the second warning information about the obstacle detected on the right side of the vehicle is higher than the priorities of the other types, the display position information is defined such that the display area 205 of the second warning information is placed at the rightmost position in the displayable region 2 as shown in FIG. 17B.

As for the information having no special relations between the content of the information and the direction of display (such as the AV information, navigation information, and vehicle information), it is desirable to display the information at the center of the displayable region 2, that is, directly in front of the driver to enable the driver to readily look at the display. Thus, in FIG. 17C, when the priority of the AV information is higher than the priorities of the other types, for example, the display position information is defined in such a manner as to place the display area 204 of the AV information at the center of the displayable region 2. The positions of the display areas 201, 202, 203 and 205 shown in FIG. 17C are an example, and it is sufficient to define the positions in accordance with the priorities of the types of information.

Figure 18:
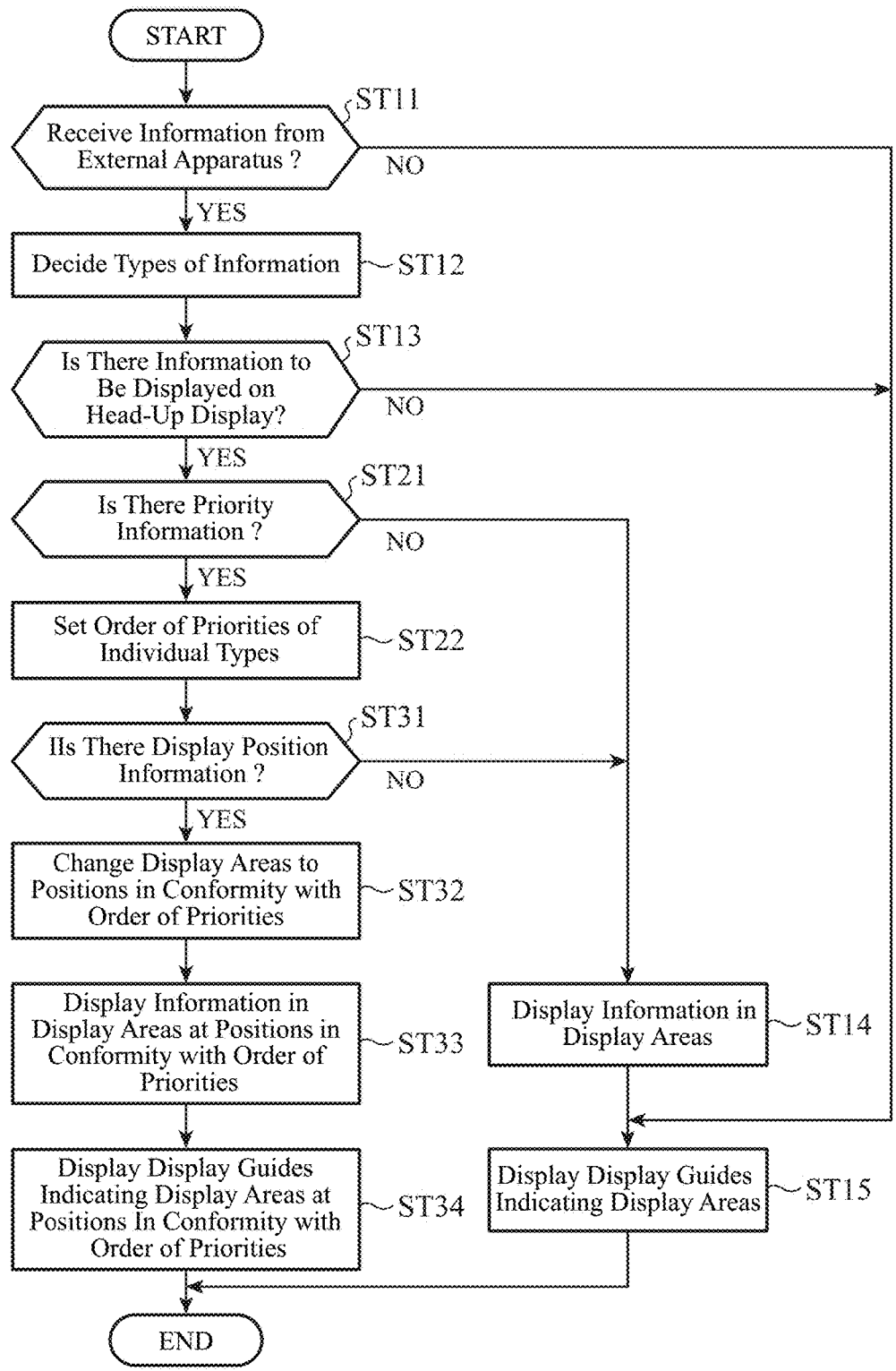
FIG. 18 is a flowchart illustrating the operation of the display control device of the embodiment 3.

Next, the operation of the display position setting unit 32 and display controller 25b will be described with reference to the flowchart of FIG. 18. The display control device 20 uses a change in the information received from the external apparatus as a trigger, and repeats the operation shown by the flowchart without pause. Since the processing at steps ST11 to ST13 of FIG. 18 is the same as the processing at steps ST11 to ST13 shown in FIG. 4, and the processing at steps ST21 and ST22 of FIG. 18 is the same as the processing at steps ST21 and ST22 shown in FIG. 14, their description will be omitted.

The display position setting unit 32 receives the pieces of information, types, and priorities output from the priority order setting unit 28. As described in the foregoing embodiment 2, there are some cases where the priority order is added or not.

When the priority order is added, the display position setting unit 32 checks whether or not the display position information is stored by referring to the display position storage 31 (step ST31). When the display position storage 31 stores the display position information ("YES" at step ST31), the display position setting unit 32 acquires the display position information, and sets the positions of the display areas for the individual priorities (step ST32). Then, the display position setting unit 32 adds the positions of the display areas set by itself to the information and types received from the display size setting unit 30, and outputs the positions, the information, and the types to the display controller 25b.

In the case where the priority order is not added ("NO" at step ST21), the display position setting unit 32 outputs the information and types received from the priority order setting unit 28 to the display controller 25b.

The display controller 25b receives the information and types and the positions of the display areas output from the display position setting unit 32. There are some cases where the positions of the display areas are added or not depending on occasions. When the positions of the display areas are added, the display controller 25b uses the positions, and when the positions of the display areas are not added, the display controller 25b uses the positions which are set in advance (for example, the arrangement order shown in FIG. 3).

When the positions of the display areas are added, the display controller 25b acquires at step ST33 the display information, which correspond to the types of information received from the display position setting unit 32, from the display information storage 23, and instructs the head-up display 10 to display the display information in the display areas at the positions set by the display position setting unit 32.

After that, the display controller 25b acquires from the display guide storage 24 the information about the display guides corresponding to all the display areas in the displayable region 2, and instructs the head-up display 10 to display the information about the display guides under the individual display areas at the positions set by the display position setting unit 32 (step ST34).

When the positions of the display areas are not added ("NO" at step ST21 or "NO" at step ST31), the display controller 25b acquires from the display information storage 23 the display information corresponding to the types of information received from the display position setting unit 32 in the same manner as that of the foregoing embodiments 1 and 2, and instructs the head-up display 10 to display the display information without changing the positions (step ST14).

After that, as is the same with the foregoing embodiments 1 and 2, the display controller 25b acquires the information about the display guides corresponding to all the display areas in the displayable region 2 from the display guide storage 24, and instructs the head-up display 10 to display the information about the display guides without changing the positions (step ST15).

At steps ST14 and ST15, since the positions of the display areas and display guides are not changed, they take the same arrangement order as that shown in FIG. 3.

Next, a concrete example of the embodiment 3 will be described.

Receiving the vehicle information from the vehicle speed sensor 12 and the AV information from the AV system 14 ("YES" at step ST11), the type deciding unit 22 decides the types of information (step ST12) and decides that the vehicle information and the AV information are the pieces of information to be displayed on the head-up display 10 ("YES" at step ST13). Here, when the priority order storage 27 stores the priority information defining that the AV information is given the first priority, and the other types are given the second priority ("YES" at step ST21), in accordance with the priority information, the priority order setting unit 28 sets the AV information at the first priority and the remaining types including the vehicle information at the second priority (step ST22).

When the display position storage 31 stores the display position information of FIGS. 17A to 17C ("YES" at step ST31), the display position setting unit 32 sets the positions of the display areas 201 to 205 in accordance with the display position information of FIG. 17C (step ST32). The display controller 25b instructs the head-up display 10 to display the display information and the display guides of the corresponding types in the display areas whose positions are set in accordance with the priority order (steps ST33 and ST34). As a result, the displayable region 2 of the windshield 1 is represented in a state as shown in FIG. 17C. Since the AV information with the first priority is displayed in the display area 204 at the center of the displayable region 2, the driver can readily watch the AV information.

After that, assume that the foregoing AV information disappears, and that the type deciding unit 22 newly receives, in addition to the foregoing vehicle information, the information about the detection of an obstacle on the left side of the vehicle from the obstacle detector 11, and the information about the ON state from the left blinker switch ("YES" at step ST11). The type deciding unit 22 decides that the type of information about the detection of the obstacle is the first warning information, and that the information about the blinker switch is the vehicle information (step ST12), and decides that these pieces of information should be displayed on the head-up display 10 ("YES" at step ST13). Here, the priority order storage 27 stores the priority information defining that when the information about the ON state of the left blinker switch and the information about the detection of the obstacle on the left side of the vehicle are inputted, the first warning information is given the first priority, and the priorities of information of the other types are reduced one by one ("YES" at step ST21). In accordance with the priority information, the priority order setting unit 28 sets the first warning information at the first priority and sets the remaining types including the vehicle information at the second priority (step ST22).

In accordance with the display position information of FIG. 17A, the display position setting unit 32 sets the positions of the display areas 201 to 205 in such a manner that the display area 201 corresponding to the first warning information with the first priority is arranged at the leftmost position in the displayable region 2 (step ST32). The display controller 25b instructs the head-up display 10 to display the display information and display guides of the corresponding types in the display areas, the positions of which are set in accordance with the priory order (steps ST33 and ST34). As a result, the displayable region 2 of the windshield 1 is represented in a state as shown in FIG. 17A. Since the driver's attention is paid to the left side of the vehicle in making a left turn, the driver can readily notice and watch the first warning information, which is displayed in the display area 201 at the leftmost position in the displayable region 2.

As described above, according to the embodiment 3, the display control device 20 is configured to comprise the priority order setting unit 28 for setting the priority order of the individual types in accordance with the content of the display information; and the display position setting unit 32 for setting the arrangement order of the display areas 201 to 205 on the basis of the priority order of the individual types set by the priority order setting unit 28. The display controller 25b is configured to change the arrangement order of the display areas 201 to 205 and display guides 211 to 215 in conformity with the arrangement order set by the display position setting unit 32. Displaying the pieces of information in the arrangement order corresponding to the priority order enables the driver to readily grasp the information. In addition, even if the arrangement order of the display area is changed, the display guides are continually displayed, so that the driver can easily anticipate what information is displayed and which portion of the display is used.

Embodiment 4

In the embodiment 4, the sizes and the arrangement order of the display areas 201 to 205 in the displayable region 2 are variable by combining the configurations of the foregoing embodiments 2 and 3.

Figure 19:
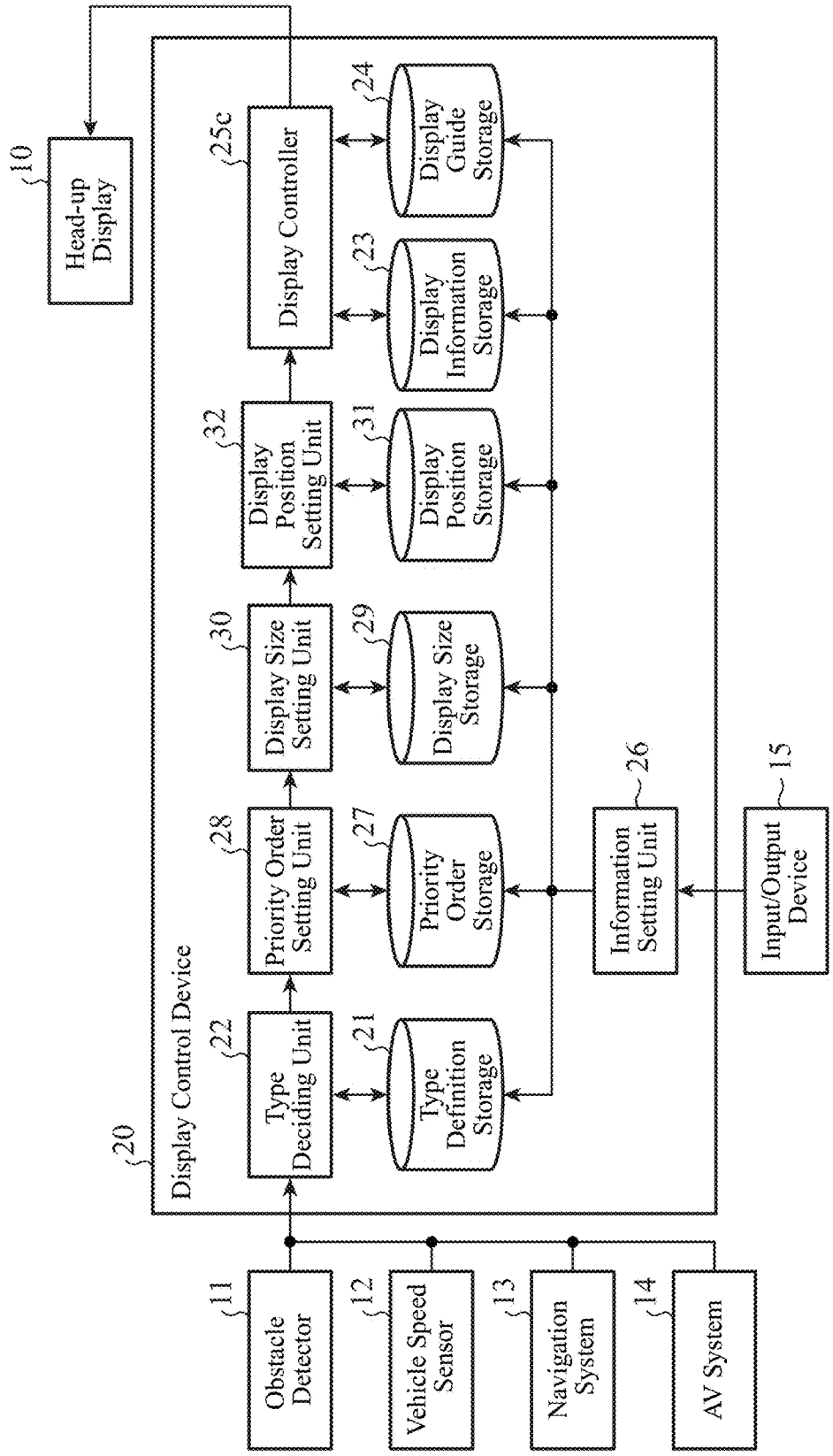
FIG. 19 is a block diagram showing a configuration of an on-vehicle display system using a display control device according to an embodiment 4 of the present invention.

FIG. 19 is a block diagram showing a configuration of the display control device 20 of the embodiment 4. The display control device 20 of the embodiment 4 comprises, in addition to the configuration of the foregoing embodiment 1, the priority order storage 27, priority order setting unit 28, display size storage 29 and display size setting unit 30 which are described in the foregoing embodiment 2, and the display position storage 31 and display position setting unit 32 which are described in the foregoing embodiment 3. In FIG. 19, the same or corresponding portions as those of FIGS. 12 and 16 are designated by the same reference numerals and their description will be omitted.

As in FIG. 2 of the foregoing embodiment 1, the display control device 20 of the embodiment 4 is also connected with the obstacle detector 11, vehicle speed sensor 12, navigation system 13 and AV system 14 operating as the external apparatus, and the display control device 20 creates the display information from the information output from the external apparatus, and causes the head-up display 10 to display the display information. In addition, the display control device 20 is connected with the input/output device 15 for receiving an operation of a user (such as a driver).

The embodiment 4 will be described below with reference to the displayable region 2 of FIG. 3.

Figure 20:
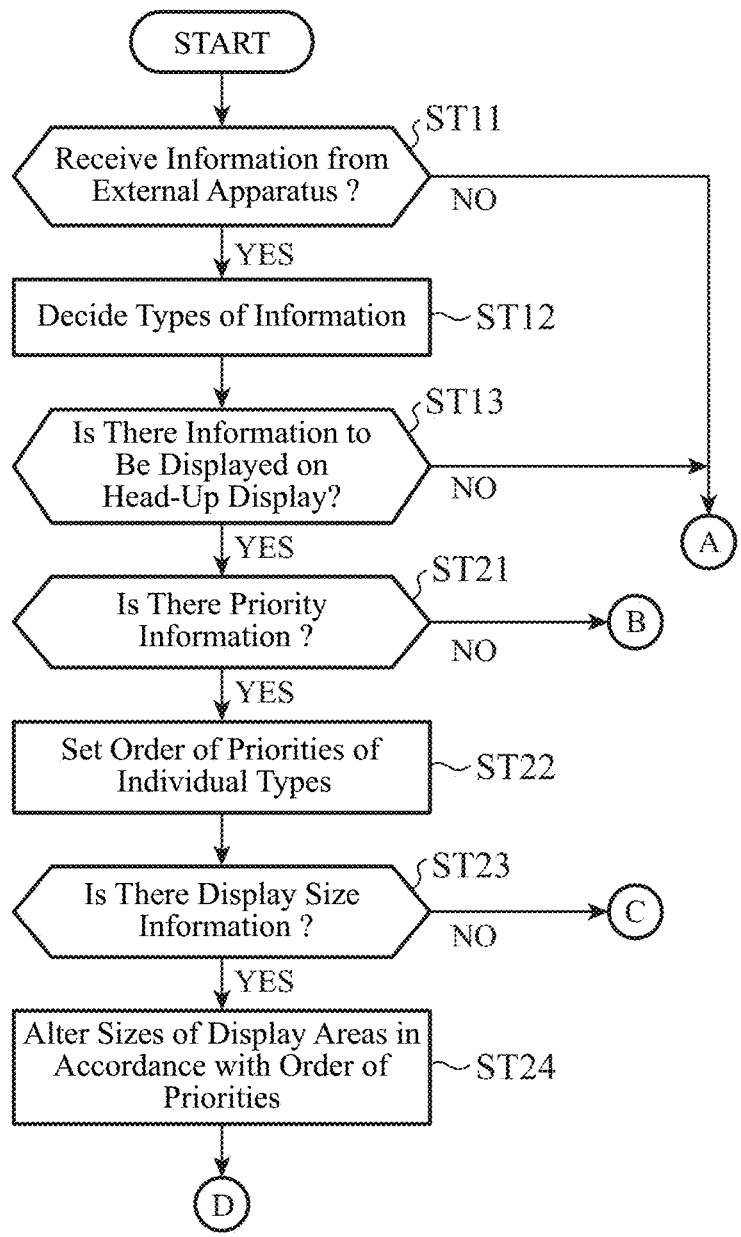
FIG. 20 is a flowchart illustrating the operation of the display control device of the embodiment 4.
Figure 21:
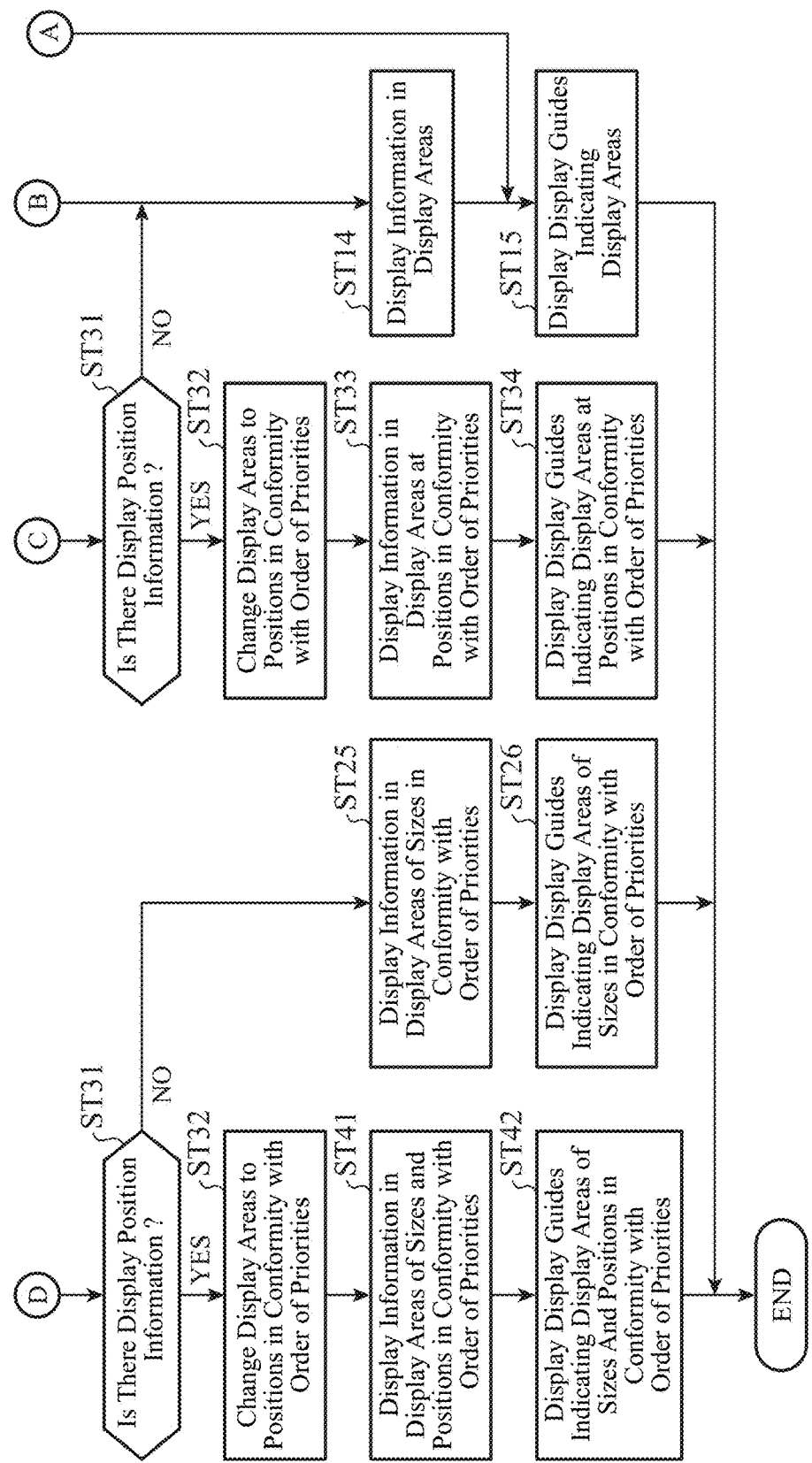
FIG. 21 is continuation of the flowchart of FIG. 20.

First, the operation of the display controller 25c will be described with reference to the flowchart of FIGS. 20 and 21. The display control device 20 uses a change in the information received from the external apparatus as a trigger, and repeats the operation shown by the flowchart without pause. As for the processing at steps ST11 to ST13, ST21 to ST26, and ST31 to ST34 shown in FIGS. 20 and 21, since the processing is the same as the processing of steps ST11 to ST13 shown in FIG. 4, of steps ST21 to ST26 shown in FIG. 14 and of steps ST31 to ST34 shown in FIG. 18, the description thereof is omitted.

The display controller 25c receives the pieces of information and types and the sizes and positions of the display areas output from the display position setting unit 32. However, as described in the foregoing embodiment 2, there are some cases where the sizes of the display areas are added or not. In addition, as described in the foregoing embodiment 3, there are some cases where the positions of the display areas are added or not.

When the sizes and positions of the display areas are added, the display controller 25c acquires at step ST41 the display information corresponding to the types of information received from the display position setting unit 32, from the display information storage 23, and changes the sizes of the display information in accordance with the sizes of the display areas set by the display size setting unit 30. Then, the display controller 25c instructs the head-up display 10 to display the pieces of display information, whose sizes are changed in the display areas set by the display position setting unit 32.

At the following step ST42, the display controller 25c acquires the information about the display guides corresponding to all the display areas in the displayable region 2 from the display guide storage 24, and alters the sizes of the individual display guides in conformity with the sizes of the individual display areas set by the display size setting unit 30. Then, the display controller 25c instructs the head-up display 10 to display the individual display guides whose sizes are altered on the lower side of the individual display areas whose positions are set by the display position setting unit 32.

When the sizes of the display areas are added, the display controller 25c executes the processing at steps ST25 and ST26.

When the positions of the display areas are added, the display controller 25c executes the processing at steps ST33 and ST34.

Unless both the sizes and positions of the display areas are added, the display controller 25c executes the processing as steps ST14 and ST15.

Next, a concrete example of the embodiment 4 will be described.

Assume that the type deciding unit 22 receives from the navigation system 13 the information about navigation guidance for making a left turn at the intersection 30 meters ahead ("YES" at step ST11). The type deciding unit 22 decides that the type of information described above is the navigation information (step ST12), and that the information is to be displayed on the head-up display 10 ("YES" at step ST13). When the priority order storage 27 stores the priority information defining that when the distance to the intersection at which the vehicle is expected to make a left turn becomes less than 100 meters, the navigation information is given the first priority, and the first warning information is given the second priority ("YES" at step ST21), and in accordance with the priority information, the priority order setting unit 28 gives the first priority to the navigation information, the second priority to the first warning information, and the third priority to the pieces of information of the other types (step ST22).

Here, assume that the display size storage 29 stores the display size information defining that the size ratios of the display areas with the first, second, third, fourth and fifth priorities are 1:0.6:0.5:0.4:0.3. In that case ("YES" at step ST23), the display size setting unit 30 sets the sizes of the individual display areas in such a manner that the size ratio of the display area 203 of the navigation information is 1, the size ratio of the display area 201 of the first warning information is 0.6, and the size ratio of the display areas 202, 204 and 205 with the other types is 0.5 (step ST24).

Figure 22:
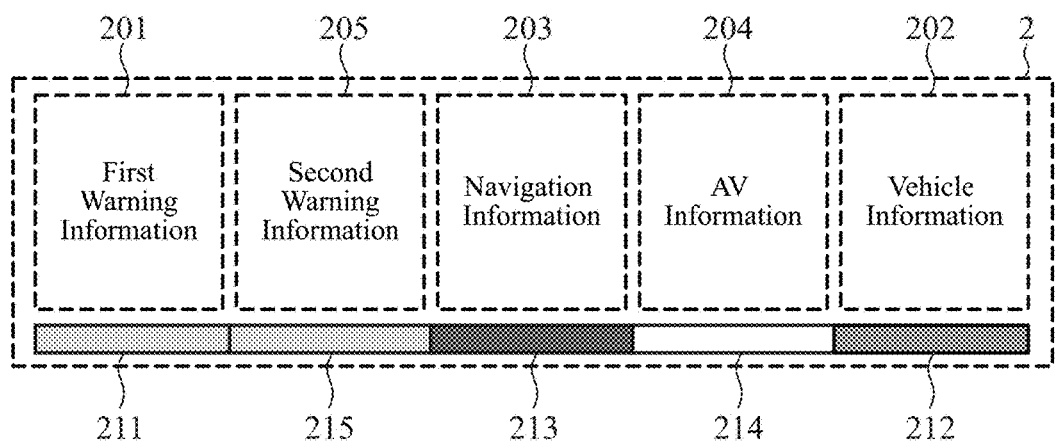
FIG. 22 is a diagram illustrating display position information of the embodiment 4.

Assume that when the navigation information is given the first priority, the first warning information the second priority, and the information with the other types the third priority, the arrangement order shown in FIG. 22 is stored in the display position storage 31 as the display position information ("YES" at step ST31). The display position information of FIG. 22 defines that the display area 201 for displaying the first warning information with the second priority is placed side by side with the display area 205 for displaying the second warning information at the leftmost location of the displayable region 2, and the display area 203 for displaying the navigation information with the first priority is placed at the center of the displayable region 2, and the display area 204 for displaying the AV information and the display area 202 for displaying the vehicle information, to which the third priority is given, are placed side by side on the right side of the center. The display position setting unit 32 sets the positions of the display areas 201 to 205 in accordance with the display position information of FIG. 22 (step ST32).

Figure 23:
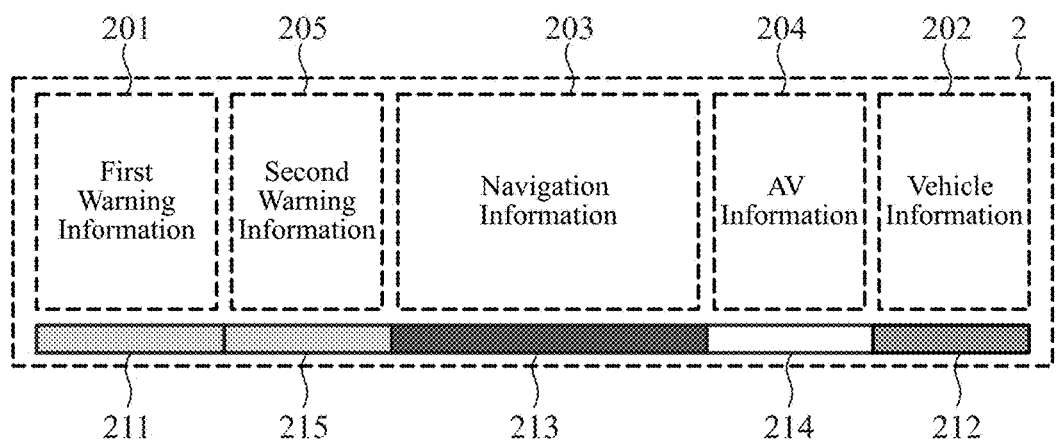
FIG. 23 is a diagram illustrating an example of the displayable region of the embodiment 4.

The display controller 25c instructs the head-up display 10 to display the display information and the display guides with the types corresponding to the display areas whose sizes and positions are set in accordance with the priority order of the individual display areas (steps ST41 and ST42). As a result, the displayable region 2 of the windshield 1 is represented as a state as shown in FIG. 23.

As described above, according to the embodiment 4, the display control device 20 is configured to comprise the priority order setting unit 28 for setting the priority order of the individual types in accordance with the content of the display information; the display size setting unit 30 for setting the sizes of the display areas 201 to 205 on the basis of the priority order of the individual types set by the priority order setting unit 28; and the display position setting unit 32 for setting the arrangement order of the display areas 201 to 205 on the basis of the priority order of the individual types set by the priority order setting unit 28. The display controller 25c is configured to change the sizes of the display areas 201 to 205 and the display guides 211 to 215 in accordance with the sizes set by the display size setting unit 30, and to change the arrangement order of the display areas 201 to 205 and the display guides 211 to 215 in accordance with the arrangement order set by the display position setting unit 32. Displaying the pieces of information on the basis of the sizes and the arrangement order corresponding to the priority order enables the driver to easily grasp the pieces of information. In addition, even if the sizes and the arrangement order of the display areas change, the display guides are continually displayed, so that the driver can readily grasp and anticipate what information is displayed and which portion of the display is used.

Incidentally, in the foregoing description, the display size setting unit 30 executes the processing of setting the sizes of the display areas, and subsequently the display position setting unit 32 executes the processing of setting the positions of the display areas, but this sequence may be reversed.

Embodiment 5

In the foregoing embodiments 1 to 4, the number of the display areas 201 to 205 in the displayable region 2 is fixed as shown in FIG. 3. In contrast with this, in the embodiment 5, the number of the display areas is variable.

Figure 24:
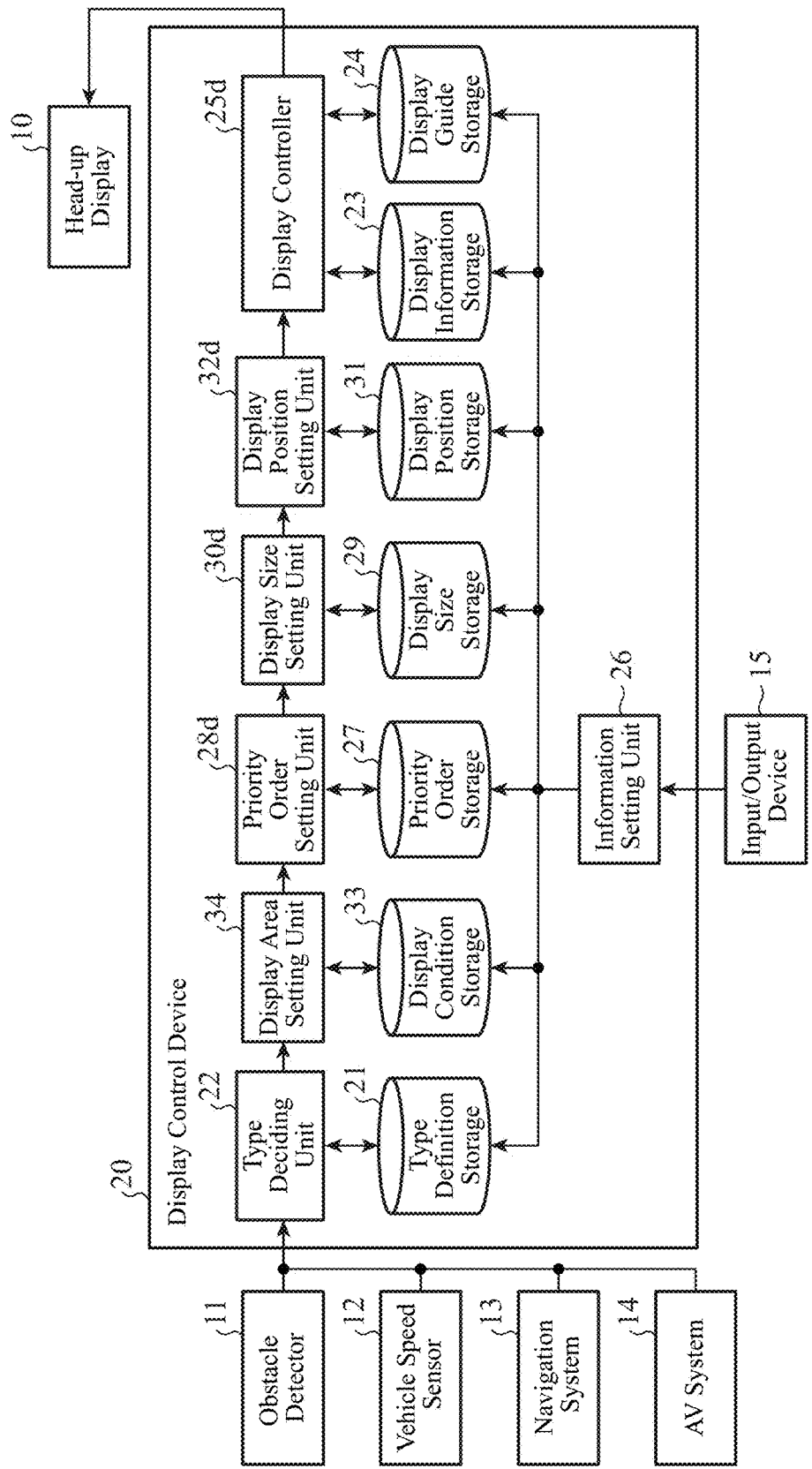
FIG. 24 is a block diagram showing a configuration of an on-vehicle display system using a display control device according to an embodiment 5 of the present invention.

FIG. 24 is a block diagram showing a configuration of the display control device 20 of the embodiment 5. The display control device 20 of the embodiment 5 comprises, in addition to the foregoing embodiment 4, a display condition storage 33 and a display area setting unit 34. The display condition storage 33 is located in the memory 5 of FIG. 11. The display area setting unit 34 is implemented by the processor 4 of FIG. 11 which executes a program stored in the memory 5. In FIG. 24, the same or corresponding portions as those of FIG. 19 are designated by the same reference numerals and their description will be omitted.

As in FIG. 2 of the foregoing embodiment 1, the display control device 20 of the embodiment 5 is also connected with the obstacle detector 11, vehicle speed sensor 12, navigation system 13 and AV system 14, which operate as the external apparatus, and the display control device 20 creates the display information from the information output from the external apparatus, and causes the head-up display 10 to display the information. In addition, the display control device 20 is connected with the input/output device 15 for receiving the operation of a user (such as a driver).

The embodiment 5 will be described below with reference to the displayable region 2 of FIG. 3.

The display condition storage 33 stores display conditions for deciding the types of information to be displayed in accordance with the state of the vehicle. As described in the foregoing embodiment 2, during the travel of the vehicle, the information about the drive support such as the navigation information, warning information and vehicle information is more important than the AV information, whereas during the stoppage of the vehicle, the importance of the information about the drive support diminishes so that the necessity for displaying the information is low. For this reason, during the travel of the vehicle, the display areas 201 to 205 are set in the displayable region 2 to display the first and second warning information, vehicle information, navigation information and AV information, whereas during the stoppage of the vehicle, the display conditions are defined such that only the display areas 204, 202 and 203 for displaying the AV information, vehicle information and navigation information are set in the displayable region 2.

Incidentally, the description here is only an example, but does not limit the correspondence between the types of information and the presence or absence of display. In addition, as a state of the vehicle, the example in which the travel or stoppage of the vehicle is exemplified is shown, but this is not essential.

In addition, it may be such that a user changes the correspondence between the types of information and the presence or absence in the display area settings. In this case, the information setting unit 26 receives the display conditions inputted by a user through the input/output device 15, and the display condition storage 33 stores the display conditions.

The display area setting unit 34 receives the pieces of information and types the type deciding unit 22 outputs. The display area setting unit 34 acquires the display conditions from the display condition storage 33 and decides whether or not the content of the information received from the type deciding unit 22 corresponds to the display conditions. In the foregoing example, the display area setting unit 34 decides whether the vehicle is traveling or stopped. Furthermore, the display area setting unit 34 sets the display areas with the types to be displayed in the displayable region 2 in accordance with the decided state of the vehicle. Then, the display area setting unit 34 adds a piece of display area designating information for designating the display areas with the types to be provided in the displayable region 2, to the information and types received from the type deciding unit 22 and outputs the addition results to the priority order setting unit 28d.

Here, a concrete example of the embodiment 5 will be described by way of example defining as the display conditions that the display areas 201 to 205 for displaying the first and second warning information, vehicle information, navigation information and AV information are set in the displayable region 2 during the travel of the vehicle, and that only the display areas 204, 202 and 203 for displaying the AV information, vehicle information and navigation information are set in the displayable region 2 during the stoppage of the vehicle.

While the vehicle is stopped, the display area setting unit 34 creates the display area designating information indicating that only the display areas 204, 202 and 203 of the AV information, vehicle information and navigation information are set. Incidentally, the processing of the display area setting unit 34 is executed between step ST13 and step ST21 in the flowchart shown in FIGS. 20 and 21.

The priority order setting unit 28d receives the pieces of information and types and the display area designating information the display area setting unit 34 outputs. Then, the priority order setting unit 28d sets the priority order of the AV information, vehicle information and navigation information designated by the display area designating information, and outputs the pieces of information and types, and the display area designating information and the priority order to the display size setting unit 30d.

The display size setting unit 30d receives the pieces of information and types, and the display area designating information and the priority order from the priority order setting unit 28d. Then, the display size setting unit 30d sets the sizes of the display areas 202, 204 and 203 designated by the display area designating information, and outputs the information and types, the display area designating information, and the priority order and sizes of the display areas to the display position setting unit 32d.

The display position setting unit 32d receives the pieces of information and types, the display area designating information, the priority order and the sizes of the display areas output from the display size setting unit 30d. Then, the display position setting unit 32d sets the positions of the display areas 202, 204 and 203 designated by the display area designating information and outputs the information and types, the display area designating information, and the sizes and positions of the display areas to the display controller 25d.

The display controller 25d receives the pieces of information and types, the display area designating information, and the sizes and positions of the display areas output from the display position setting unit 32d. Then, when there are the pieces of information to be displayed in the display areas 202, 204 and 203 designated by the display area designating information, the display controller 25d acquires the pieces of display information from the display information storage 23, changes the sizes of the display areas on the basis of the sizes set by the display size setting unit 30d, and instructs the head-up display 10 to display the display information at the positions set by the display position setting unit 32d.

In addition, the display controller 25d acquires the information about the display guides 212, 214 and 213 indicating the display areas 202, 204 and 203 designated by the display area designating information from the display guide storage 24, changes the sizes of the display guides to the sizes set by the display size setting unit 30d, and instructs the head-up display 10 to display the display guides at the positions set by the display position setting unit 32d.

Figure 25:
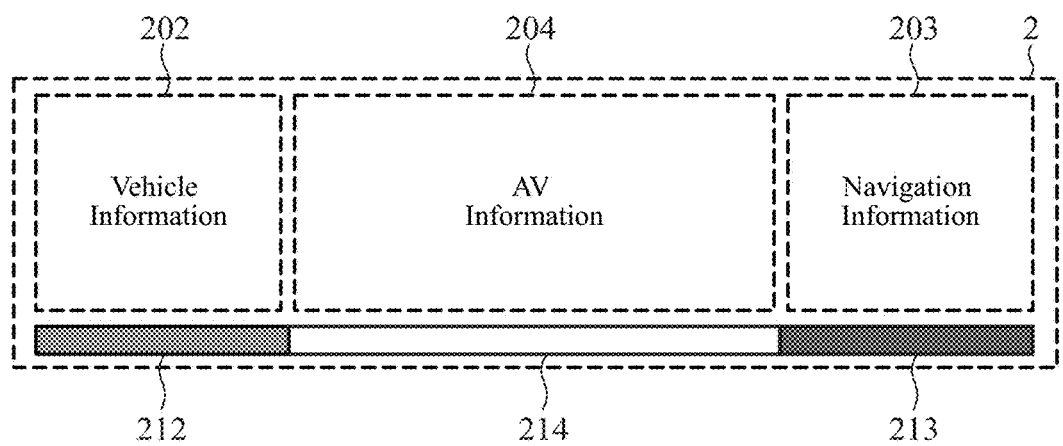
FIG. 25 is a diagram illustrating an example of the displayable region of the embodiment 5.

Thus, as shown in FIG. 25, only the display area 202 for displaying the vehicle information and its display guide 212, the display area 204 for displaying the AV information and its display guide 214, and the display area 203 for displaying the navigation information and its display guide 213 are displayed in the displayable region 2. In contrast, the display areas for displaying the first and second warning information and their display guides, which are set not to be displayed by the display area setting unit 34, are not displayed in the displayable region 2.

As described above, according to the embodiment 5, the display control device 20 is configured to comprise the display area setting unit 34 for deciding the types of display information to be displayed on the head-up display 10 in accordance with the state of the vehicle, and for setting the display areas corresponding to the types decided to be displayed. The display control device 20 does not display the information with a low priority for the driver depending on the state of the vehicle, thereby enabling the driver to visually verify the information with a higher priority readily. In addition, when a display area is deleted, the display guide for indicating the display area is not displayed. Thus, the display control device 20 makes the driver to readily grasp and anticipate what information is displayed and which portion of the display is used.

Incidentally, in the embodiments 2 to 5, the positions where the display guides are displayed are not limited to the lower side of the display areas as in the foregoing embodiment 1, but may be the top, right side, left side or a combination of them. In addition, the shape of the display guides is not limited to a belt shaped pattern as shown in FIG. 3, but can take a pattern as shown in FIGS. 6 to 8. Furthermore, the display areas need not be arranged side by side in a line as shown in FIG. 3, but can take the pattern as shown in FIG. 9 or FIG. 10.

In addition, it is also possible to change the colors of the display guides depending on the types of display information to be displayed in the display areas, or to match the colors of the display guides indicating the display areas to the colors included in the display information to be displayed in the display areas.

Incidentally, it is to be understood that a free combination of the individual embodiments, modifications of any components of the individual embodiments or removal of any components of the individual embodiments is possible within the scope of the present invention.

INDUSTRIAL APPLICABILITY

A display control device according to the present invention displays the display guides for the individual display areas so as to enable a user to readily anticipate what information is displayed and which portion of a display is used. Accordingly, the display control device is suitable for a head-up display that displays pieces of information which vary from time to time irrespective of the presence or absence of information to be displayed. In addition, the display control device is suitable for an application not only to a head-up display using the windshield or combiner of a vehicle, but also to a mobile head-up display designed for person, railway, ship or aircraft.

REFERENCE SIGNS LIST 1 windshield; 2 displayable region; 3 steering wheel; 4 processor; 5 memory; 10 head-up display; 11 obstacle detector; 12 vehicle speed sensor; 13 navigation system; 14 AV system; 15 input/output device; 20 display control device; 21 type definition storage; 22 type deciding unit; 23 display information storage; 24 display guide storage; 25, 25a-25d display controller; 26 information setting unit; 27 priority order storage; 28, 28d priority order setting unit; 29 display size storage; 30, 30d display size setting unit; 31 display position storage; 32, 32d display position setting unit; 33 display condition storage; 34 display area setting unit; 201 to 205 display area; 211 to 215 display guide.

The invention claimed is:

1. A display control device to control a head-up display that displays a virtual image of display information in a manner as to superimpose the virtual image on a scene outside a moving body, the display control device comprising:
   a type decider to decide types of display information;
   a display controller to cause the head-up display to display the display information with the types decided by the type decider, in display areas of the head-up display, the display areas being provided for the individual types of display information, and to display guides indicating the individual display areas regardless of presence or absence of the display information;
   a priority order setter to set a priority order of the individual types in accordance with content of the display information; and
   a display size setter to set sizes of the individual display areas on a basis of the priority order of the individual types set by the priority order setter,
   wherein the display controller changes sizes of the display areas and sizes of the display guides in accordance with the sizes set by the display size setter.

2. The display control device according to claim 1, further comprising:
   a display position setter to set an arrangement order of the individual display areas on a basis of the priority order of the individual types set by the priority order setter, wherein
   the display controller changes the arrangement order of the display areas and the display guides in accordance with the arrangement order set by the display position setter.

3. The display control device according to claim 1, further comprising:
   a display area setter to decide the types of display information to be displayed on the head-up display in accordance with a state of the moving body, and for setting the display areas corresponding to the types that are decided to be displayed.

4. The display control device according to claim 1, wherein
   the display guides differ in color for the individual types of display information to be displayed in the display areas.

5. The display control device according to claim 4, wherein
   colors of the display guides for indicating the display areas are equivalent to colors included in the display information to be displayed in the display areas.

6. The display control device according to claim 1, wherein
   the display guides are comprised of a figure, a letter or a combination of the figure and the letter.

* * * * *